US010666569B1

(12) United States Patent
Jacques de Kadt et al.

(10) Patent No.: US 10,666,569 B1
(45) Date of Patent: May 26, 2020

(54) JOURNAL SERVICE WITH NAMED CLIENTS

(71) Applicant: Amazon Technologies, Inc., Seattle, WA (US)

(72) Inventors: Christopher Richard Jacques de Kadt, Seattle, WA (US); Benjamin Warren Mercier, Seattle, WA (US); Carlos Vara Callau, Seattle, WA (US); Timothy Daniel Cole, Seattle, WA (US); Aaron Gifford Freshwater, Seattle, WA (US); Sayantan Chakravorty, Sammamish, WA (US); Allan Henry Vermeulen, Corvallis, OR (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 15/275,296

(22) Filed: Sep. 23, 2016

(51) Int. Cl.
*G06F 11/14* (2006.01)
*G06F 16/18* (2019.01)
(Continued)

(52) U.S. Cl.
CPC .............. *H04L 47/70* (2013.01); *H04L 67/10* (2013.01); *H04L 67/02* (2013.01)

(58) Field of Classification Search
CPC ......... H04L 47/70; H04L 67/10; H04L 67/02; H04L 41/5009; H04L 12/14; H04L 63/20;
(Continued)

(56) References Cited

U.S. PATENT DOCUMENTS

| 6,732,124 B1 | 5/2004 | Koseki et al. |
| 7,257,690 B1 * | 8/2007 | Baird .................. G06F 11/1471 |
| | | 707/999.202 |

(Continued)

OTHER PUBLICATIONS

"Amazon Kinesis Streams," © 2016 Amazon Web Services, Inc., <https://aws.amazon.com/kinesis/streams/> [retrieved Sep. 15, 2016], 6 pages.

(Continued)

*Primary Examiner* — David R Lazaro
*Assistant Examiner* — Berhanu Shitayewoldetadik
(74) *Attorney, Agent, or Firm* — Davis Wright Tremaine LLP

(57) ABSTRACT

A journal service manages a journal that holds a number of journal entries. Journal entries are provided to the journal service by one or more producer services, and the journal service provides journal entries to one or more consumer services. Lead consumers retrieve journal entries from the journal service by specifying a named cursor which identifies a location within the journal from which the journal entries are retrieved. The journal service may select a lead producer and a lead consumer from a collection of candidate producers and consumers using a fitness score determined for each candidate producer and consumer. The fitness score may be based at least in part on the processing capability, predicted reliability, and cost of each candidate producer and consumer. The journal service may replace a lead consumer or producer with an alternate consumer or producer in response to a variety of events.

20 Claims, 20 Drawing Sheets

(51) Int. Cl.
*G06F 16/23* (2019.01)
*H04L 12/911* (2013.01)
*H04L 29/08* (2006.01)

(58) Field of Classification Search
CPC . H04L 47/2458; H04L 47/2433; G06Q 20/29; G06Q 20/145; G06Q 20/065; H04W 4/24; H04M 15/57
USPC .......................................................... 709/226
See application file for complete search history.

(56) References Cited

U.S. PATENT DOCUMENTS

| | | | |
|---|---|---|---|
| 7,386,850 B2 | 6/2008 | Mullen | |
| 8,244,886 B2* | 8/2012 | Short | H04L 63/08 709/228 |
| 8,612,330 B1 | 12/2013 | Certain et al. | |
| 9,055,067 B1 | 6/2015 | Ward, Jr. et al. | |
| 9,230,000 B1 | 1/2016 | Hsieh et al. | |
| 9,400,607 B1* | 7/2016 | Daud | H04L 67/1097 |
| 9,423,978 B2 | 8/2016 | Long et al. | |
| 9,465,630 B1 | 10/2016 | Muniz et al. | |
| 9,466,036 B1 | 10/2016 | Vicaire | |
| 9,479,567 B1* | 10/2016 | Koorapati | H04L 67/06 |
| 9,495,196 B2* | 11/2016 | Anderson | G06F 9/45558 |
| 9,571,573 B1* | 2/2017 | Koorapati | H04L 67/1095 |
| 9,734,157 B1* | 8/2017 | Brahma Raju | G06F 3/06 |
| 9,824,114 B1* | 11/2017 | Steinke | G06F 16/16 |
| 9,852,147 B2* | 12/2017 | von Muhlen | G06F 16/178 |
| 9,858,301 B1* | 1/2018 | Hardy | G06F 16/215 |
| 9,959,357 B2* | 5/2018 | Goel | H04L 67/10 |
| 9,985,848 B1 | 5/2018 | Ward, Jr. | |
| 9,990,391 B1 | 6/2018 | Cole et al. | |
| 2001/0044845 A1* | 11/2001 | Cloonan | H04L 47/2408 709/226 |
| 2002/0133473 A1* | 9/2002 | Grande | G06Q 30/0284 705/418 |
| 2002/0147625 A1* | 10/2002 | Kolke, Jr. | G06Q 10/06311 705/7.13 |
| 2003/0055983 A1* | 3/2003 | Callegari | G06F 16/29 709/227 |
| 2003/0061565 A1* | 3/2003 | Brendle | G06F 16/9574 715/206 |
| 2004/0235488 A1* | 11/2004 | Choi | H04L 47/24 455/452.2 |
| 2005/0021836 A1* | 1/2005 | Reed | G06F 9/542 709/238 |
| 2005/0198359 A1 | 9/2005 | Basani et al. | |
| 2006/0041505 A1* | 2/2006 | Enyart | G06Q 20/102 705/40 |
| 2006/0178918 A1* | 8/2006 | Mikurak | G06Q 10/06 705/7.25 |
| 2006/0184381 A1* | 8/2006 | Rice | G06Q 30/016 705/26.1 |
| 2007/0033436 A1* | 2/2007 | Kingsbury | G06F 9/526 714/19 |
| 2007/0038714 A1* | 2/2007 | Sell | H04L 51/34 709/206 |
| 2007/0087756 A1* | 4/2007 | Hoffberg | G06Q 10/0631 455/450 |
| 2007/0143767 A1 | 6/2007 | Attanasio et al. | |
| 2007/0192261 A1 | 8/2007 | Kelkar et al. | |
| 2007/0266037 A1* | 11/2007 | Terry | G06F 3/0607 |
| 2007/0271422 A1* | 11/2007 | Osaki | G06F 21/568 711/154 |
| 2008/0046443 A1* | 2/2008 | Fachan | G06F 12/0804 |
| 2008/0071853 A1 | 3/2008 | Mosier et al. | |
| 2008/0263460 A1* | 10/2008 | Altberg | G06Q 30/02 715/757 |
| 2009/0100459 A1* | 4/2009 | Riedl | H04N 21/2385 725/35 |
| 2009/0132671 A1* | 5/2009 | Chkodrov | H04L 51/00 709/206 |
| 2009/0133039 A1* | 5/2009 | Chkodrov | H04L 51/00 719/314 |
| 2010/0058349 A1 | 3/2010 | Diwakar et al. | |
| 2010/0235285 A1* | 9/2010 | Hoffberg | G06Q 20/401 705/75 |
| 2010/0262860 A1 | 10/2010 | Sargor et al. | |
| 2010/0317437 A1* | 12/2010 | Berry | G07F 17/3225 463/35 |
| 2011/0251868 A1* | 10/2011 | Mikurak | G06Q 10/06 705/7.25 |
| 2011/0295722 A1* | 12/2011 | Reisman | G06Q 30/0201 705/27.1 |
| 2012/0084113 A1 | 4/2012 | Brandwine et al. | |
| 2012/0084443 A1 | 4/2012 | Theimer et al. | |
| 2012/0089410 A1* | 4/2012 | Mikurak | G06Q 10/00 705/1.1 |
| 2012/0123924 A1* | 5/2012 | Rose | G06O 20/381 705/35 |
| 2012/0179476 A1* | 7/2012 | Muncy | G06Q 30/0207 705/1.1 |
| 2012/0221525 A1 | 8/2012 | Gold et al. | |
| 2012/0323644 A1* | 12/2012 | Custer | G06Q 30/0222 705/14.1 |
| 2013/0018963 A1* | 1/2013 | Brauff | G06Q 10/107 709/206 |
| 2013/0042005 A1 | 2/2013 | Boss et al. | |
| 2013/0091282 A1 | 4/2013 | Tontiruttananon et al. | |
| 2013/0111261 A1 | 5/2013 | Dalton | |
| 2013/0198319 A1 | 8/2013 | Shen et al. | |
| 2013/0212285 A1 | 8/2013 | Hoffmann et al. | |
| 2014/0052836 A1* | 2/2014 | Nguyen | H04L 45/306 709/223 |
| 2014/0089506 A1* | 3/2014 | Puttaswamy Naga | H04L 45/42 709/225 |
| 2014/0146674 A1* | 5/2014 | Wang | H04L 45/38 370/235 |
| 2014/0153787 A1* | 6/2014 | Schmidtler | G06K 9/00469 382/112 |
| 2014/0244661 A1* | 8/2014 | Peiris | G06F 16/3322 707/748 |
| 2014/0280956 A1 | 9/2014 | Shu et al. | |
| 2014/0282586 A1 | 9/2014 | Shear et al. | |
| 2015/0006733 A1 | 1/2015 | Khan et al. | |
| 2015/0040131 A1 | 2/2015 | Shan et al. | |
| 2015/0058557 A1* | 2/2015 | Madhusudana | G06F 3/0655 711/114 |
| 2015/0088816 A1* | 3/2015 | Kruglick | H04L 47/38 707/610 |
| 2015/0248253 A1 | 9/2015 | Kim et al. | |
| 2015/0264073 A1* | 9/2015 | Tavakoli | H04L 63/1425 726/23 |
| 2015/0277987 A1 | 10/2015 | Di Balsamo et al. | |
| 2015/0326532 A1* | 11/2015 | Grant | H04L 63/0218 726/1 |
| 2015/0347245 A1 | 12/2015 | Andre et al. | |
| 2015/0347252 A1 | 12/2015 | Andre et al. | |
| 2016/0043941 A1* | 2/2016 | D'Heureuse | H04L 41/0896 370/390 |
| 2016/0043996 A1* | 2/2016 | Syed Mohamed | H04L 63/20 726/1 |
| 2016/0100417 A1* | 4/2016 | Mosko | H04W 72/10 370/329 |
| 2016/0253195 A1 | 9/2016 | Banzhaf et al. | |
| 2016/0292179 A1* | 10/2016 | von Muhlen | G06F 16/178 |
| 2016/0308905 A1* | 10/2016 | Stiekes | H04L 47/20 |
| 2016/0342486 A1* | 11/2016 | Kedem | G06F 16/27 |
| 2016/0357610 A1 | 12/2016 | Bartfai-Walcott et al. | |
| 2017/0034063 A1* | 2/2017 | Mozolewski | H04L 45/021 |
| 2017/0111445 A1 | 4/2017 | Kunde et al. | |
| 2017/0228705 A1* | 8/2017 | Sandor | G06Q 20/065 |
| 2017/0257322 A1 | 9/2017 | Nagao | |

(56) References Cited

U.S. PATENT DOCUMENTS

2017/0286517 A1* 10/2017 Horowitz ............ G06F 11/0709
2018/0026852 A1    1/2018 Anderson et al.

OTHER PUBLICATIONS

Kreps, J., "The Log: What Every Software Engineer Should Know About Real-Time Data's Unifying Abstraction," Linkedin.com, Dec. 16, 2013, https://engineering.linkedin.com/distributed-systems/log-what-every-software-engineer-sh . . .> [retrieved Sep. 15, 2016], 29 pages.

"Leader Election Pattern," © 2016 Microsoft, <https://msdn.microsoft.com/en-us/library/dn568104(d=printer).aspx> [retreived Sep. 15, 2016], 8 pages.

* cited by examiner

US 10,666,569 B1

JOURNAL SERVICE WITH NAMED CLIENTS

CROSS REFERENCE TO RELATED APPLICATIONS

This application incorporates by reference for all purposes the full disclosure of co-pending U.S. patent application Ser. No. 15/275,300, filed Sep. 23, 2016, entitled "MANAGEMENT OF ALTERNATIVE RESOURCES," co-pending U.S. patent application Ser. No. 15/275,302, filed Sep. 23, 2016, entitled "RESOURCE MANAGER," and co-pending U.S. patent application Ser. No. 15/275,307, filed Sep. 23, 2016, entitled "MANAGEMENT OF A DATA PROCESSING PIPELINE."

BACKGROUND

In many computer systems, a collection of services are implemented and individual services in the collection of services act as consumers and/or producers of various types of information. In some implementations, the producers communicate directly with the consumers, but in other implementations interactions between the producers and the consumers are facilitated through the use of a queue structure called a journal. The journal acts as a shared queue that accepts journal entries from one or more producer services ("producer") and delivers journal entries to one or more compatible consumer services ("consumer"). A journal service maintains the entries in the queue, as well as information that identifies which entries have been processed and which have yet to be processed.

In many journal-based computing systems, the producers and the consumers coordinate interactions with each other so that only a single active producer with a particular role and a single active consumer with a particular role interact with a journal at a time. It is difficult for the producers and the consumers of journal entries to effectively coordinate the selection of an active producer and an active consumer for each role. If a poorly performing active consumer or active producer is selected to process journal entries, overall performance of the journaled system may be substantially impaired.

BRIEF DESCRIPTION OF THE DRAWINGS

Various techniques will be described with reference to the drawings, in which.

DETAILED DESCRIPTION

Figure 1:
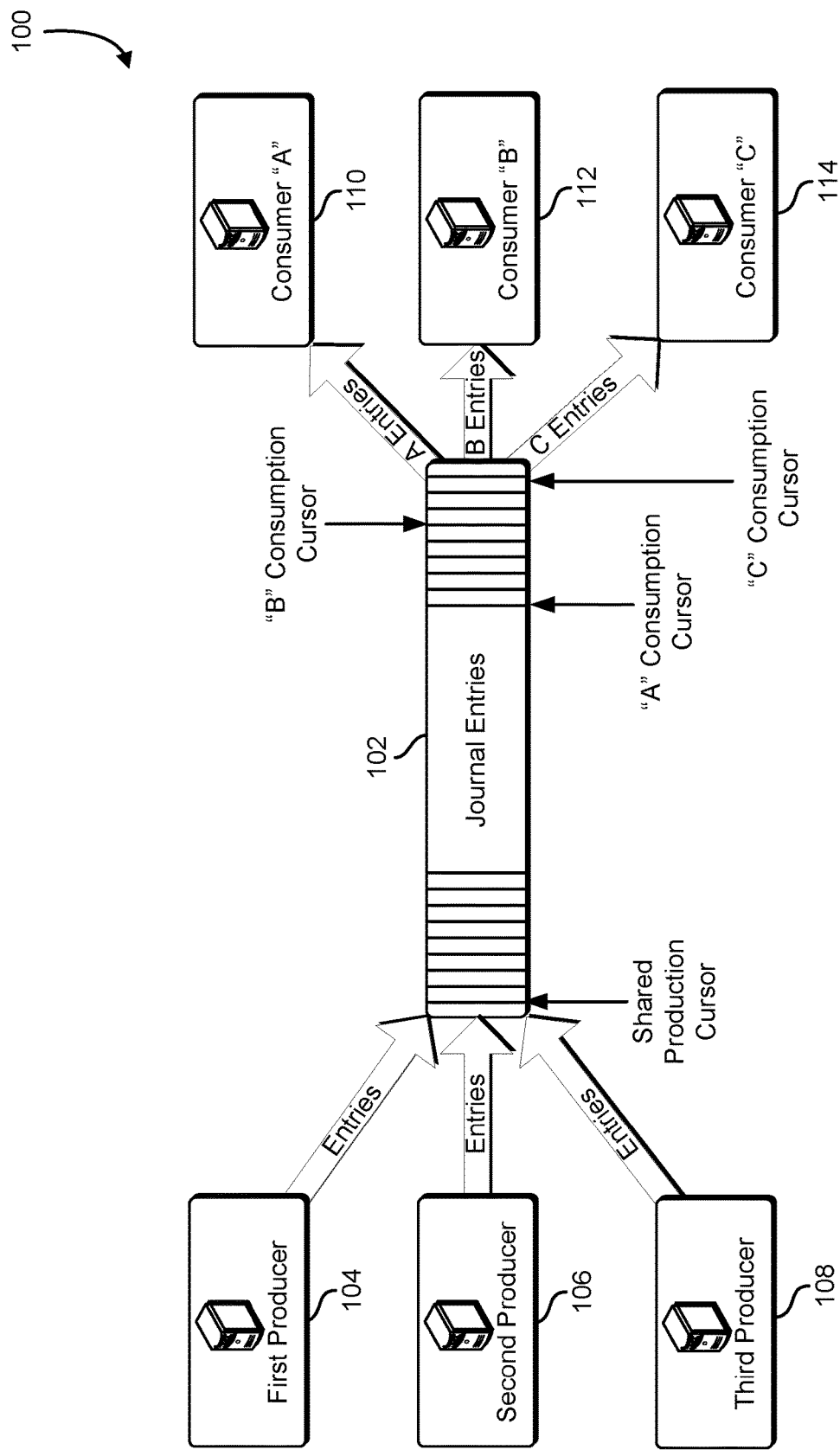
FIG. 1 shows an illustrative example of an environment in which various embodiments may be practiced.

The current document describes a journal service that improves the processing of journal entries by providing, to a collection of journal-entry producers and journal-entry consumers, a service interface that supports named consumers and named producers, with each name corresponding to an independent role. The journal service maintains a journal that holds journal entries in an order, and one or more named consumer cursors. Each cursor identifies a location within the journal. The journal service selects one or more lead producers from the set of named producers. The selected producers add journal entries to the journal. Named producers that are not selected are not permitted to add journal entries to the journal. For a particular named consumer cursor, the journal service receives requests for journal entries from a set of corresponding named consumers, and selects a lead consumer from the set of named consumers. The journal service provides the lead consumer with journal entries at the journal location indicated by the particular named consumer cursor. The particular named consumer cursor is updated as a result of the lead consumer indicating that the provided journal entries have been successfully processed. Consumers that are not selected as the lead consumer are not provided with journal entries. In many examples, the journal service selects a single lead producer and a single lead consumer. In various implementations, journals which support named consumers and producers allow clients to implement deep pipelines, significantly improving performance.

The lead consumers and lead producers are selected based at least in part on a capability score. The capability score may be based at least in part on a variety of factors that influence the reliability and capability of a particular producer or consumer. In some examples, the capability score is a metric determined by measuring a rate at which journal entries may be produced or consumed by a particular producer or consumer. In another example, the capability score is a metric determined in part by an amount of computing resources available to a particular producer or consumer. For example, the capability score may be adjusted based at least in part on an amount and speed of available processors, an amount of free memory, available memory cache, available disk space, or available network bandwidth. The capability score of a producer may be determined differently than the capability score of a consumer.

Producers and consumers that are not selected by the journal service may be maintained in a pool of alternate consumers and producers. Alternate consumers and producers may be maintained in an order based at least in part on the capability score used to determine the lead consumer or lead producer. In some examples, alternate consumers and producers are maintained in an order based on a fallback score. The fallback score is determined so that alternate resources are at least in part less likely to fail when the corresponding lead consumer or producer fails. For example, the fallback score favors alternate consumers and producers whose resources ("alternate resources") that do not share infrastructure dependencies with the currently selected lead consumer or producer. For a particular lead consumer, the journal service may favor alternate resources that are hosted on different computer systems, in different data centers, on different network segments, or use different software versions.

In some implementations, alternate consumers associated with more than one name may be managed in a shared alternate resources pool. The journal service creates an ordering of alternate consumers for each named consumer. For example, if the journal service maintains a first consumption cursor and a second consumption cursor, after selection of a first lead consumer and a second lead consumer, alternate resources for the first consumption cursor and the second consumption cursor are placed in a pool of shared alternate resources. The journal service generates a first fallback sequence of resources for the first consumption cursor, and a second fallback sequence of resources for the second consumption cursor. In some examples, a single alternate resource may be represented in both the first fallback sequence and the second fallback sequence. By maintaining alternate resources in a pool of shared alternate resources, utilization of alternate resources may be improved and reliability of the system may be increased.

A number of triggering events may cause a selected lead consumer or lead producer to be replaced with an alternate consumer or producer. In some examples, a lead producer or lead consumer may experience a hard failure that results in journal entries no longer being placed in or removed from the journal. Hard failure of a producer may be detected by periodically polling the lead producer to ensure that the lead producer is active. In some implementations, the status of the lead producer is checked when the number of journal entries in the journal reaches zero or a new journal entry has not been placed in the journal for a threshold amount of time. The status of the lead consumer may be checked when the number of journal entries in the journal exceeds a threshold number of journal entries, or when the lead consumer has not requested a journal entry for a threshold amount of time. If the journal service detects hard failure of the lead consumer or the lead producer, the lead consumer or the lead producer is replaced with an alternate consumer or an alternate producer.

In some examples, the lead producer or the lead consumer may be replaced with an alternate consumer or producer for reasons other than the hard failure of the lead producer or the lead consumer. In the present document, the replacement of a lead producer or lead consumer may be referred to as impeachment. In some examples, the journal service monitors the performance of the lead producer and the lead consumer for declining performance. If the journal service determines that the performance of the lead producer or the lead consumer has declined below the predicted performance of an alternate producer or consumer, the lead producer or lead consumer is impeached, and the alternate producer or consumer is promoted to the lead producer or the lead consumer. Additional reasons for replacing a lead consumer or a lead producer may include declining performance of a lead consumer or lead producer, the availability of more capable alternative resources, the availability of less costly alternative resources, or other factors. In some examples, an impeached lead consumer or producer may be used as an alternative resource. In additional examples, alternative resources in an alternative resource pool may be removed from the resource pool based at least in part on cost, declining performance, and other factors.

Replacement of the lead consumer or lead producer ("impeachment") may also occur as a result of adjustments made by the journal service to equalize the rate of production and the rate of consumption of journal entries. For example, if the lead producer is producing journal entries at a rate significantly higher than the lead consumer is able to consume them, the number of journal entries in the journal will increase. If the number of journal entries in the journal increases over a threshold value, the journal service evaluates alternate consumers within a pool of available alternate consumers. If the journal service determines that a particular alternate consumer is capable of processing a greater number of journal entries than the current lead consumer, the current lead consumer is impeached, and is no longer allowed to consume journal entries. The determined particular alternate consumer is promoted to the lead consumer. In another example, if a more capable alternate consumer is not available, the journal service examines a pool of alternate producers, and identifies a less capable producer having a lower cost of operation than the current lead producer. If a less capable producer having a lower cost of operation is available, the current project lead producer is impeached and replaced with the lower cost producer.

FIG. 1 shows an illustrative example of an environment in which various embodiments may be practiced. A system diagram 100 shows a number of producers and a number of consumers that interact with a journal 102 maintained by a journal service. In the example shown, a producer is a service or application hosted by a computer system which produces journal entries and provides the produced journal entries to the journal service for placement in the journal 102. In the example shown, a consumer is a service or application hosted by computer system which retrieves journal entries from the journal service, processes the retrieved journal entries, and notifies the journal service that the retrieved journal entries have been processed. The journal 102 retains a number of journal entries in a determined order, and one or more cursors. A cursor is a variable that identifies a particular journal entry in the journal. The cursor is associated with the journal, and the value of the cursor may be updated to move the cursor forward or backward through a sequence of journal entries in response to journal entries being added, removed, or otherwise processed. In some examples, the journal stores journal entries in a block of addressable memory and a cursor is a pointer to a location in the block of addressable memory. The cursor is updated by incrementing or decrementing the value of the cursor an amount corresponding to the size, in addressable units, of a journal entry. In another example, a cursor is an index to an ordered list of journal entries. The cursor is updated by adding or subtracting a count to the index value. In yet another example, a cursor is a pointer to a journal entry, and the ordering of the journal entries is defined using links between journal entries. The cursor is updated by setting the cursor to the value of the link to the next journal entry or the previous journal entry. Each cursor can be a production cursor or a consumption cursor. Production cursors record a location in the journal where new journal entries can be written by a producer. In some examples, the production cursor may be omitted, and replaced with a production role which is assigned to a producer. The production role is associated with the ability to submit journal entries to the journal service, and when a producer having the production role submits a journal entry, the journal entry is appended to the end of the journal. Consumption cursors indicate a processing checkpoint from which corresponding named consumers are drawing journal entries. Each cursor is associated with a name. When consumers or producers interact with the journal 102, they specify a name of a cursor. The cursor name indicates a location within the journal 102 with which the consumer or producer wishes to interact. As consumers or producers confirm interactions with the journal 102, the journal service updates the appropriate cursor.

The journal 102 may be accessed by one or more producers and one or more consumers. In the example shown in FIG. 1, journal entries are added to the journal 102 by a first producer 104, a second producer 106, and a third producer 108. Individual producers generate journal entries and submit the journal entries to the journal 102 identifying a shared production cursor. In some examples, a journal entry is provided to the journal service as a parameter of a function or procedure call. In another example, journal entries are provided to the journal service as a parameter via a network service. In yet another example, journal entries are provided to the journal service as a message via a computer network, or using a messaging service. As a particular producer places a journal entry in the journal 102, the journal service provides a confirmation to the particular producer, and updates the position of the shared production cursor to the next available location in the journal. The journal service performs the addition of each journal entry and update of the shared production cursor as an atomic operation. In some implementations, the journal service selects a producer from a set of available producers, and designates the selected producer as a lead producer. In various implementations, the journal service designates the lead resource by recording, in memory accessible to the journal system, an identifier associated with the lead resource. The journal service prevents producers other than the lead producer from adding journal entries to the journal 102. For example, if the journal service selects the first producer 104 as the lead producer, the second producer 106 and third producer 108 will be prevented from adding journal entries to the journal 102. In another example, the journal service limits the number of lead producers to a particular number of producers. In some examples, the journal service prevents resources other than the lead resource from interacting with the journal service by suspending the operation of resources other than the journal service. Resources may be suspended by placing those resources into an idle state, a suspended state, or hibernation state. In one implementation, the journal service causes the host of a particular alternate resource to save the state of the host and nonvolatile memory, and powers on the host. In some examples, the journal service prevents resources other than the lead resource from interacting with the journal service by registering the lead resource with a journal service, and causing the journal service to displace any current leader. The journal service identifies resources that attempt to interact with the journal, and rejects interaction requests from non-lead resources.

In the example shown in FIG. 1, journal entries are consumed by three consumer services, a first consumer 110, a second consumer 112, and a third consumer 114. The first consumer 110 consumes journal entries using a consumption cursor associated with the name "A." As journal entries are retrieved from the journal 102 by the first consumer 110, the first consumer 110 confirms the processing of the retrieved journal entries, causing the journal service to update the consumption cursor associated with the name "A." The second consumer 112 consumes journal entries using a consumption cursor associated with the name "B." As journal entries are retrieved from the journal 102 by the second consumer 112, the second consumer 112 confirms the processing of the retrieved journal entries, causing the journal service to update the consumption cursor associated with the name "B." The third consumer 114 consumes journal entries using a consumption cursor associated with the name "C." As journal entries are retrieved from the journal 102 by the third consumer 114, the third consumer 114 confirms the processing of the retrieved journal entries, causing the journal service to update the consumption cursor associated with the name "C." In some examples, more than one consumer service will attempt to retrieve entries using a given named consumption cursor. The journal service may designate a particular consumer as the lead consumer for a given named consumption cursor. Consumers other than the lead consumer that attempt to retrieve journal entries using the given named consumption cursor will be denied access to the requested journal entries.

In various examples, a journal service may be a streaming data service, a logging service, or a data queuing service hosted by a computer server, server cluster, or virtual computing environment. Producers and consumers are services that may be hosted on the same host environment as the journal service, or on a different computer system, server cluster, or virtual computing environment. Communications between producers/consumers and the journal service may occur via inter-process communication, network calls, or local system calls.

Figure 2:
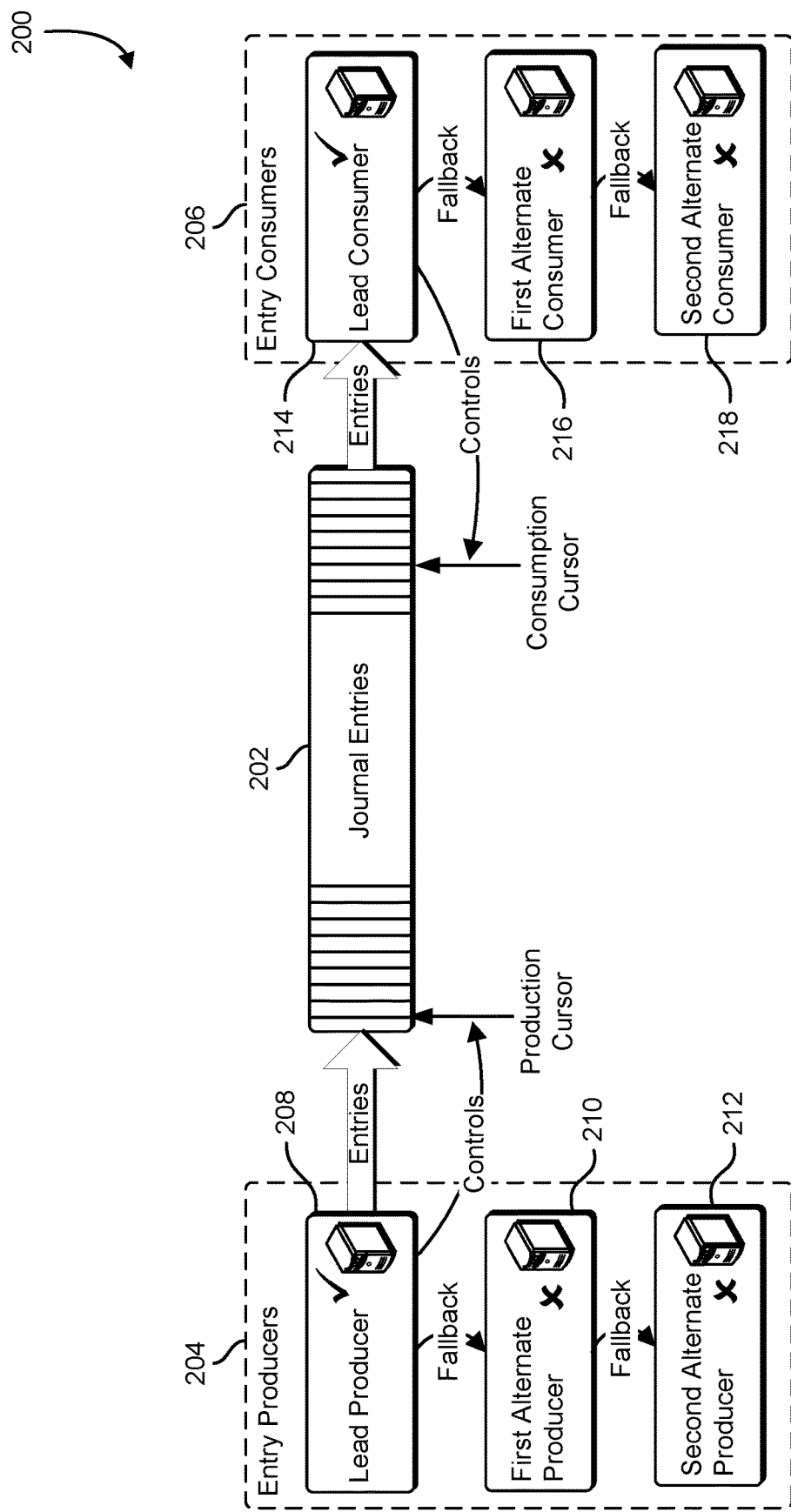
FIG. 2 shows an illustrative example of a journal service in which a lead producer and a lead consumer are selected from a number of alternate producers and consumers.

FIG. 2 shows an illustrative example of a journal service in which a lead producer and a lead consumer are selected from a number of alternate producers and consumers. A journal service may be implemented using computer system configured with either circuitry and/or executable instructions that causes the computer system to perform the functions of the journal service. A system diagram 200 shows a journal 202 that is maintained by a journal service. Journal entries are placed in the journal 202 by a set of entry producers 204, and journal entries are retrieved from the journal 202 by a set of entry consumers 206. The journal service maintains a production cursor which indicates a journal position where new journal entries may be added, and a consumption cursor which indicates a journal position from which journal entries are retrieved and provided to the set of entry consumers 206. The production cursor and the consumption cursor represent checkpoints for the production and consumption of journal entries by producers and consumers. The journal service updates the production cursor as the addition of each new journal entry is confirmed by the journal service. The journal service updates the consumption cursor after a consumer confirms that the provided journal entry has been processed by the consumer. In the example shown in FIG. 2, the journal service selects one producer from the set of entry producers 204 to act as a lead producer, and selects one consumer from the set of entry consumers 206 to act as a lead consumer.

The set of entry producers 204 includes a lead producer 208, a first alternate producer 210, and a second alternate producer 212. The journal service may receive conflicting requests to add journal entries to the journal 202 from a plurality of producers in the set of entry producers 204. The journal service resolves this problem by selecting one of the plurality of producers as a lead producer, and designates the remaining producers as alternate producers. Alternate producers are not permitted to add journal entries to the journal 202. In the example shown in FIG. 2, the journal service designates the lead producer 208 as the lead producer, and designates the first alternate producer 210 and the second alternate producer 212 as alternate producers. In some examples, alternate producers are maintained in a pool of alternate producers. In another example, alternate producers are maintained in an ordered list. A collection of fallback links defines an ordering in which alternate producers are called upon by the journal service. In the example shown in FIG. 2, if the lead producer 208 fails, the journal service will replace the lead producer 208 with the first alternate producer 210. If the first alternate producer 210 fails, the journal service will replace the first alternate producer 210 with the second alternate producer 212.

The set of entry consumers 206 includes a lead consumer 214, a first alternate consumer 216, and a second alternate consumer 218. The journal service may receive competing requests for journal entries from consumers within the set of entry consumers 206. The journal service designates a particular consumer from within the set of entry consumers 206 to act as a lead consumer. The remaining consumers are designated as alternate consumers. Requests for journal entries received from alternate consumers are not granted. In the example shown in FIG. 2, the journal service designates the lead consumer 214 as the lead consumer, and designates the first alternate consumer 216 and the second alternate consumer 218 as alternate consumers. Alternate consumers may be maintained in a pool of available alternate consumers. A fallback sequence may be defined for alternate consumers. The fallback sequence may be defined by assigning a fitness score to each alternate consumer, or by maintaining fallback links between the lead consumer and a sequence of alternate consumers. In the example shown in FIG. 2, fallback links link the lead consumer 214 to the first alternate consumer 216, and the first alternate consumer 216 to the second alternate consumer 218. If the lead consumer 214 fails, the journal service will replace the lead consumer with the first alternate consumer 216. If the first alternate consumer 216 fails, the journal service will replace the first alternate consumer 216 with the second alternate consumer 218.

Alternate consumers and alternate producers are blocked from receiving or sending journal entries to the journal service. While blocked, alternate consumers and alternate producers may be held in a variety of waiting states. In some examples, a alternate consumer or alternate producer periodically polls the journal service by attempting to send or receive a journal entry. In another example, an alternate consumer or alternate producer may enter a suspended state and wait for a signal from the journal service that causes the alternate consumer or alternate producer to reactivate. In yet another example, alternate consumers or producers may be suspended and swapped to nonvolatile storage. In yet another example, the journal service sends, to each alternate producer and alternate consumer, an indication of where the particular alternate producer or alternate consumer is in the fallback sequence. Alternate producers and consumers early in the fallback sequence remain in an active state, and periodically poll the journal service with requests to submit or receive journal entries. Alternate producers and consumers later in the fallback sequence enter a suspended state, swap to nonvolatile storage, or even terminate. In some examples, the journal service may indicate, to a alternate producer or alternate consumer, a particular idle action.

In some examples, the journal service creates an additional resource to be used as an alternate resource. In some implementations, the journal service determines a number of properties of the alternate resource configured to produce a desired reliability for the resource pool. The journal service acquires computing resources from computing service providers, connected data centers, and other resources, and configures the computing resources to perform the functions of an alternate resource. In another implementation, the journal service provides the determined requirements to the computing resources provider which returns a handle or identifier to a new configured alternate resource.

Figure 3:
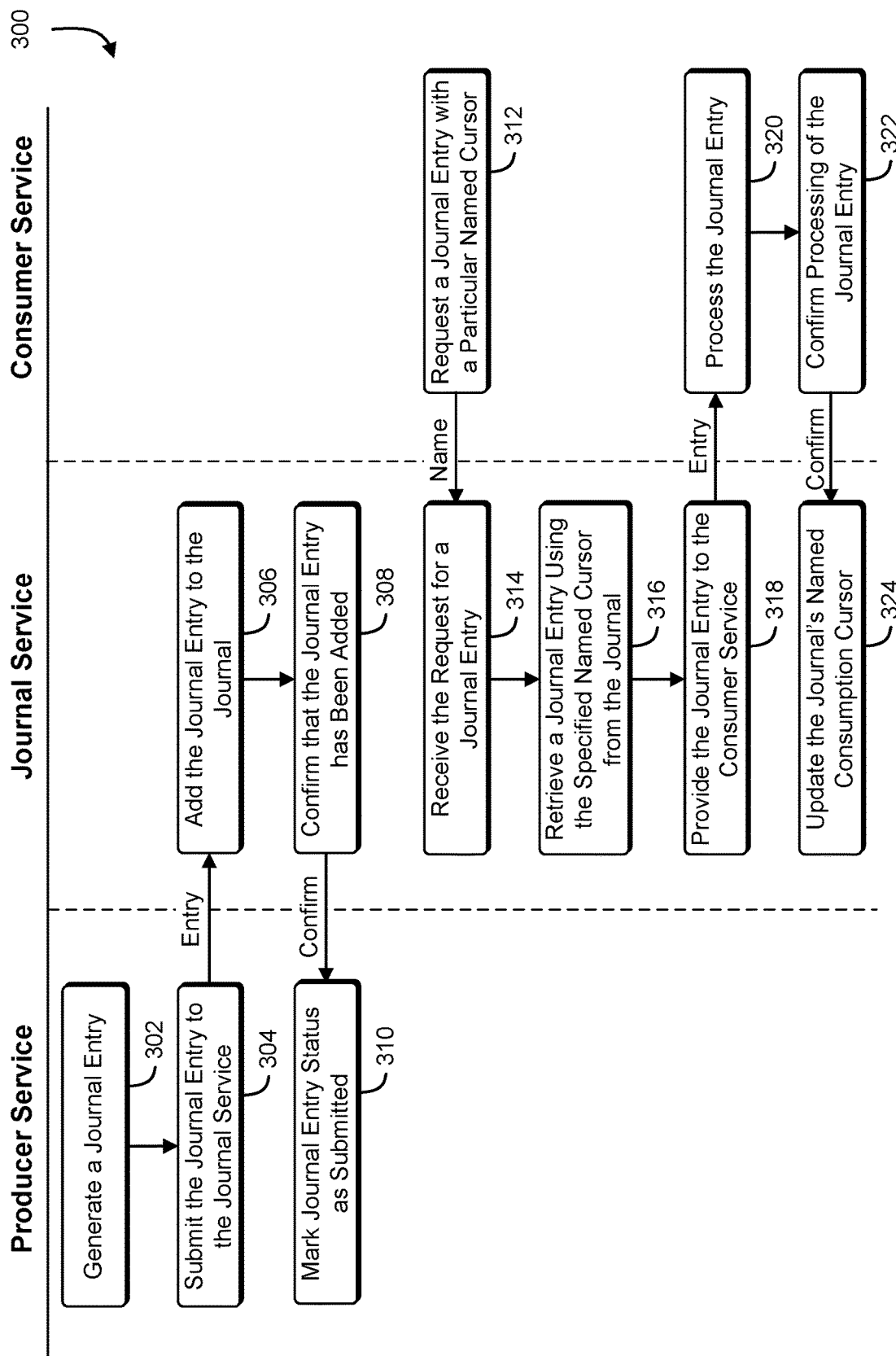
FIG. 3 shows an illustrative example of a process that, as a result of being performed by a journal service in coordination with a producer service and a consumer service, facilitates the processing of journal entries.

FIG. 3 shows an illustrative example of a process that, as a result of being performed by a journal service in coordination with a producer service and a consumer service, facilitates the processing of journal entries. A swim diagram 300 illustrates a process that begins at block 302 with a producer service generating a journal entry. The journal entry may include transactional information, raw data, request information, or other information to be processed by the consumer service. At block 304, the producer service submits the journal entry to the journal service and specifies a name associated with a production cursor.

At block 306, the journal service receives the journal entry, confirms that the producer service is a designated lead producer for the provided name, and adds the journal entry to the journal location indicated by the production cursor. The journal service advances the production cursor indicated by the producer service and sends 308 a confirmation to the producer service indicating that the journal entry has been added to the journal. At block 310, the producer service receives a confirmation and records that the journal entry has been added to the journal.

At block 312, the consumer service requests a journal entry from the journal service, and provides a name that identifies a particular cursor maintained by the journal service. The journal service receives 314 the request from the consumer service, and determines that the consumer service is a designated lead consumer for the identified named cursor. At block 316, the journal service retrieves a journal entry from the journal using the named cursor identified by the consumer service. The journal service provides 318 the retrieved journal entry to the consumer service. In various implementations, the journal entry may be provided as a return value in response to a call from the consumer service that requests a journal entry. In other implementations, the journal entry may be provided as a message sent over a computer network to the consumer service.

The consumer service receives the journal entry and, at block 320, processes the journal entry in accordance with the objectives of the consumer service. After the processing of the journal entry is complete and any results are committed, the consumer service sends 322 a confirmation to the journal service that indicates that processing of the journal entry is complete. At block 324, the journal service receives the confirmation and, as a result of receiving the confirmation, advances the named cursor in preparation for the next journal-entry request.

Figure 4:
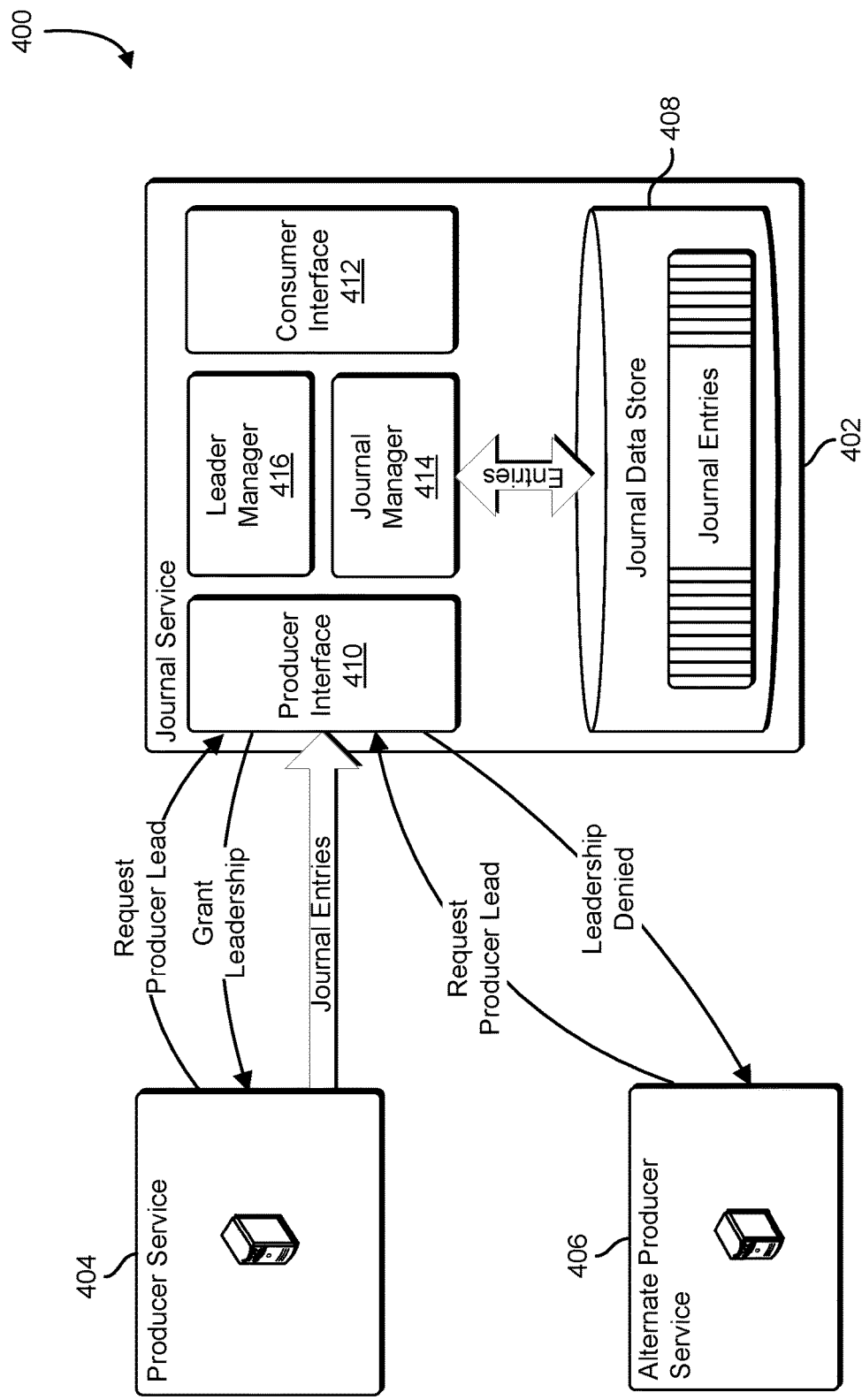
FIG. 4 shows an illustrative example of a journal service that selects a lead producer from a number of potential producers.

FIG. 4 shows an illustrative example of a journal service that selects a lead producer from a number of potential producers. A block diagram 400 shows a journal service 402, a producer service 404, and an alternate producer service 406. The journal service 402 maintains a journal in a journal data store 408. The journal data store 408 may be maintained in volatile or nonvolatile memory such as semiconductor RAM, flash memory, disk storage, or rewritable optical storage. In some examples, the journal is maintained in linearly addressable memory, and one or more cursors are maintained as pointers to locations within the linearly addressable memory. In another example, the journal is maintained in an ordered linked list, and one or more cursors are maintained as pointers to individual entries in a linked list. In yet another example, the journal is maintained in a database table by a database engine, and named cursors indicating locations within the database table are maintained by the database engine. The journal service 402 implements a producer interface 410 and a consumer interface 412. The producer interface 410 provides an interface to producers and alternate producers for submitting journal entries and, if necessary, managing the selection of a lead producer from a number of potential lead producers. The consumer interface 412 provides an interface to consumers and alternate consumers for retrieving journal entries and, if necessary, managing the selection of the lead consumer from a number of potential lead consumers.

The journal service 402 includes a journal manager 414 that maintains the journal in the journal data store 408. The journal manager 414 also maintains a collection of named cursors.

The collection of named cursors may include named producer cursors and named consumer cursors. The journal manager 414 interacts with the producer interface 410 and the consumer interface 412 to retrieve journal entries requested by consumers and store journal entries provided by producers. When a consumer submits a request by the consumer interface 412, the consumer specifies a particular named cursor as part of the request. The consumer interface 412 forwards the request to journal manager 414, and based on the named cursor identified by the consumer, the journal manager 414 retrieves a particular journal entry from the journal data store 408. The journal manager 414 returns the journal entry to the consumer via the consumer interface 412. The consumer returns a confirmation to the journal service 402 which is received by the journal manager 414. As a result of receiving the confirmation from the consumer, the journal manager 414 advances the named cursor in preparation for the next consumer request. When a producer submits a journal entry via the producer interface 410, the producer identifies a particular named production cursor. The producer interface 410 forwards the request to the journal manager 414, and the journal manager 414 adds the journal entry to the journal maintained in the journal data store 408. The new journal entry is stored at a location indicated by the named production cursor. The journal manager 414 updates the named production cursor and returns a confirmation to the producer via the producer interface 410.

The journal service 402 includes a leader manager 416. The leader manager 416 coordinates the selection of a lead producer and a lead consumer from a set of potential lead producers and a set of potential lead consumers. The leader manager 416 communicates with producers and consumers via the producer interface 410 and the consumer interface 412. Once a leader has been established for a particular named cursor, the leader manager 416 authorizes requests from the established leader relating to the particular named cursor and rejects requests relating to the particular named cursor from other consumers and producers.

In the example shown in FIG. 4, the producer service 404 submits a leadership request to the journal service 402 via the producer interface 410. The producer interface 410 forwards the request to the leader manager 416. The leadership request identifies a particular named cursor, and the leader manager 416 determines that the leadership role for the particular named cursor is not yet assigned. As a result, the leader manager 416 grants the leadership request and sends a grant notification to the producer service 404 via the producer interface 410. After being granted leadership, journal entries submitted by the producer service 404 are accepted by the journal service 402 and stored in the journal data store 408 by the journal manager 414. In some implementations, the journal service 402 advances the particular named cursor and sends a confirmation to the producer service 404. In other implementations, the journal service 402 sends a confirmation to the producer service 404. In response, the producer service 404 sends a signal to the journal service 402 which causes the journal service 402 to advance the particular named cursor.

If the alternate producer service 406 submits a request for leadership to the journal service 402 after leadership has been granted to the producer service 404, the leader manager 416 determines that leadership has already been granted to the producer service 404, and denies the leadership request from the alternate producer service 406. If the alternate producer service 406 attempts to submit a journal entry to the journal service 402, the journal service 402 determines that the alternate producer service 406 has not been granted leadership over the named cursor indicated by the alternate producer service 406, and refuses any journal entries submitted by the alternate producer service 406.

Figure 5:
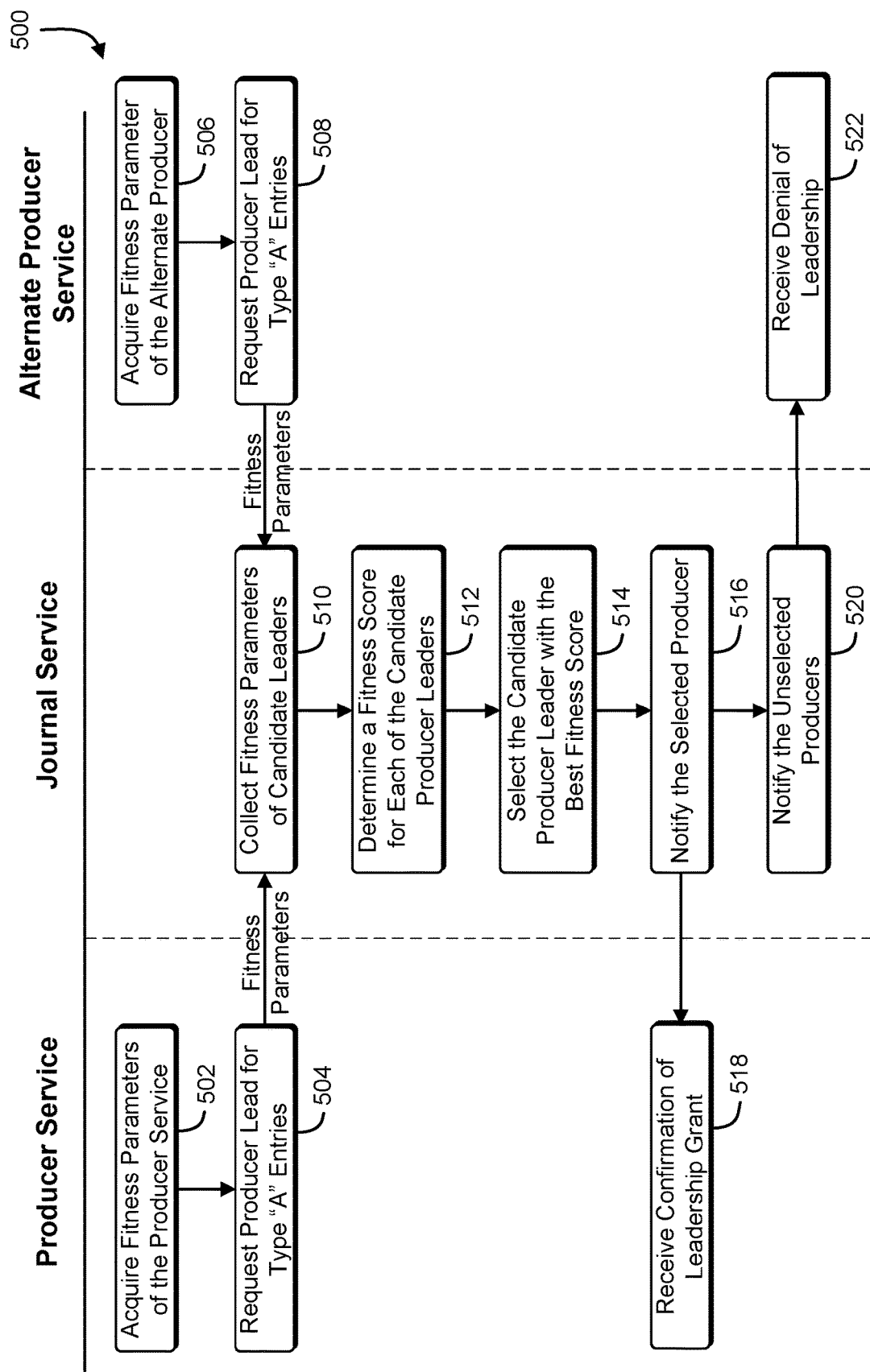
FIG. 5 shows an illustrative example of a process that, as a result of being performed by a journal service in coordination with a producer service and an alternate producer service, selects the producer service as a lead producer service.

FIG. 5 shows an illustrative example of a process that, as a result of being performed by a journal service in coordination with a producer service and an alternate producer service, selects the producer service as a lead producer service. A swim diagram 500 illustrates a process that begins at block 502 with a producer service collecting a set of fitness parameters. The set of fitness parameters includes information that may be used by a journal service to determine effectiveness of the producer service as a lead producer. The set of fitness parameters may include parameters associated with the host of the producer service such as an amount of installed memory, an amount of free memory, an amount of available disk space, a number of processors, a processor speed, a reliability measure, and an amount of available network bandwidth. Additional fitness parameters may include a geographical location of the producer service, a computer subnet to which the producer service is connected, and an identity of a computing service provider responsible for hosting the producer service. At block 504, the producer service submits a leadership request to the journal service. The leadership request includes the set of fitness parameters and a name that identifies a production cursor of a journal maintained by the journal service.

At block 506, an alternate producer service collects a set of alternate fitness parameters. The alternate set of fitness parameters includes information that may be used by the journal service to determine the effectiveness of the alternate producer service as a lead producer. The set of alternate fitness parameters may include parameters associated with the host of the alternate producer service such as those mentioned above. Additional alternate fitness parameters may include the geographical location of the alternate producer service, the cost of operation, a computer subnet to which the alternate producer service is connected, and the identity of a computing service which provides hosting of the alternate producer service. At block 508, the alternate producer service submits a leadership request to the journal service. The leadership request includes the set of alternate fitness parameters and a name that identifies a production cursor maintained by the journal service.

At block 510, the journal service receives both a request from the producer service and the request from the alternate producer service. The journal service collects the fitness parameters provided by each producer. At block 512, the journal service determines a fitness score for each producer using the fitness parameters supplied by each producer. The fitness score is a measure that provides a relative indication of the capabilities of each producer as a lead producer. The determination of a fitness score may use some, all, or none of the fitness parameters provided by the producers. In some examples, the journal service acquires additional information relating to the producers, and the additional information is used at least in part to generate the fitness scores.

In some examples, the journal service submits a challenge to each producer. The challenge may be submitted in the form of executable instructions that cause each producer to perform a task and return results to the journal service. The journal service measures an amount of time required by each producer to perform the task, and uses the amount of time to determine a capability score for each producer. In some examples, the journal service uses the results returned by each producer to determine the capability score of each producer. In another example, the journal service temporarily grants leadership to each producer in a set of producers and measures the performance of each producer during a trial period. The measured performance of each producer is used to generate a fitness score for each producer.

At block 514, based at least in part on the fitness score of each producer, the journal service selects a producer from the set of producers that have submitted leadership requests.

In many examples, a larger fitness score indicates greater fitness for leadership, and the journal service selects a producer having the highest fitness score. After a lead producer has been selected, the journal service notifies 516 the selected producer that the leadership request of the selected producer has been granted. In the example shown in FIG. 5, the producer service receives 518 a confirmation from the journal service that the leadership request of the producer service has been granted. At block 520, the journal service notifies non-selected producers that their respective leadership requests have been denied. At block 522, the alternate producer service receives an indication that the leadership request submitted by the alternate producer service has been denied.

Figure 6:
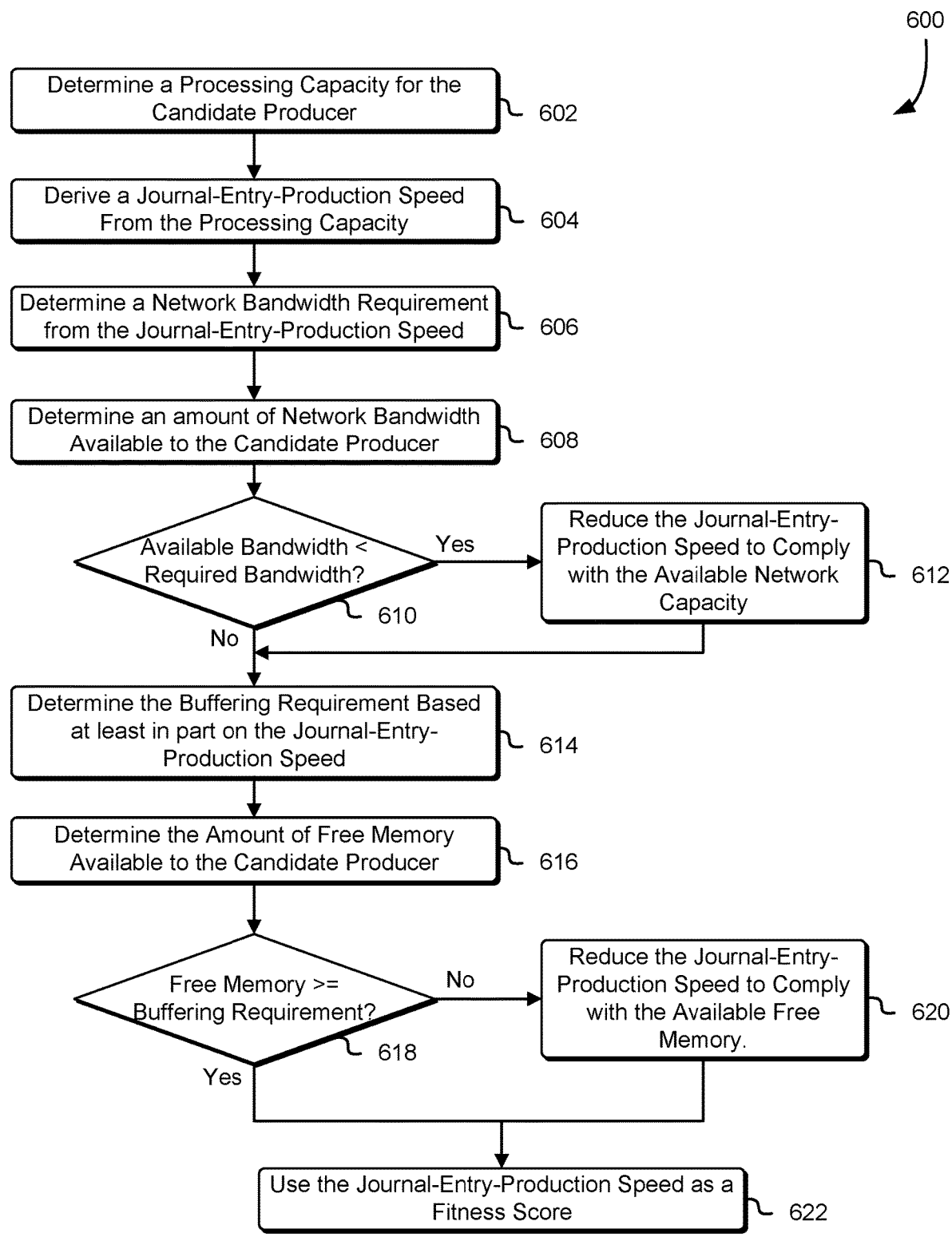
FIG. 6 shows an illustrative example of a process that, as a result of being performed by a journal service, determines a capability score for a producer of journal entries.

FIG. 6 shows an illustrative example of a process that, as a result of being performed by a journal service, determines a capability score for a producer of journal entries. A flowchart 600 shows a process that begins at block 602 with a journal service determining a processing capacity of the candidate producer. The processing capacity of the candidate producer may be determined based at least in part on processor characteristics reported by the candidate producer to the journal service, or by performance metrics collected as the result of a task executed by the candidate producer at the request of the journal service. The journal service derives 604 a maximum entry-production speed from the determined processing capacity of the candidate producer. In some implementations, the operations described in blocks 602 and 604 are combined and the candidate producer measures the amount of time required to produce a single entry, determines the maximum entry-production speed to the journal service based on the measured amount of time, and provides the maximum entry-production speed to the journal service.

At block 606, the journal service determines an amount of network bandwidth necessary to support the maximum entry-production speed by the candidate producer. In some examples, the journal service determines the network bandwidth necessary by in part multiplying the size of a journal entry by the maximum entry-production speed. The journal service determines 608 an amount of network bandwidth available to the candidate producer. At decision block 610, the journal service determines whether the network bandwidth available to the candidate producer is greater than the amount of network bandwidth necessary to support the maximum entry-production speed. If the network bandwidth available to the candidate producer is less than the amount of network bandwidth necessary to support the maximum entry-production speed, execution proceeds to block 612, and the journal service reduces the maximum entry-production speed so that the amount of network bandwidth available to the candidate producer is sufficient to support the reduced maximum entry-production speed.

At block 614, the journal service determines a buffering requirement for the candidate producer based on the maximum entry-production speed. In some examples, the buffering requirement is determined by multiplying the maximum entry-production speed by a minimum buffering time to produce a number of buffered entries, and multiplying the number of buffered entries by the size of a journal entry. At block 616, the journal service determines the amount of free memory available to the candidate producer. In many examples, the amount of free memory is provided to the journal service by the candidate producer in response to a request submitted by the journal service. At decision block 618, the journal service determines whether the amount of free memory available to the candidate producer is greater than or equal to the buffering requirement. If the amount of free memory available to the candidate producer is less than the buffering requirement, execution proceeds to block 620, and the journal service reduces the maximum entry-production speed to reduce the buffering requirement for the candidate producer in accordance with the amount of available memory available to the candidate producer.

The final maximum entry-production speed is available at block 622 and may be used by the journal service as a fitness score for the candidate producer. In some examples, the journal service may apply additional factors or limitations to the fitness score such as a reliability factor based on the host environment of the candidate producer, a cost factor that is proportional to the cost of operation of the candidate producer, or a preference factor configured by an administrator of the journal service.

Figure 7:
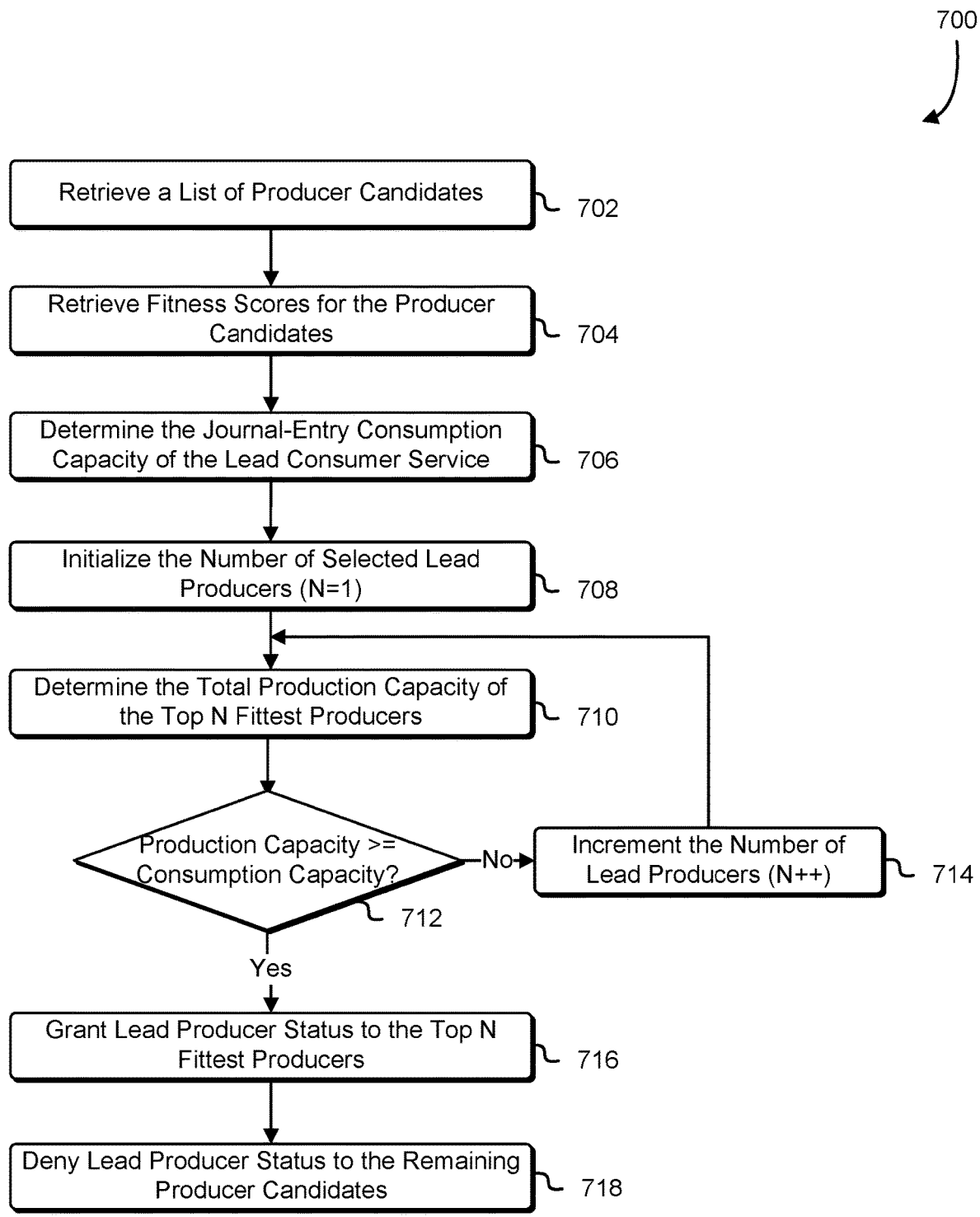
FIG. 7 shows an illustrative example of a process that, as a result of being performed by a journal service, selects one or more lead producers from a set of alternate producers based at least in part on a capability score associated with each alternate producer.

FIG. 7 shows an illustrative example of a process that, as a result of being performed by a journal service, selects one or more lead producers from a set of alternate producers based at least in part on a capability score associated with each alternate producer. A flowchart 700 shows a process that begins at block 702 with a journal service retrieving a list of producer candidates for a particular named production cursor. Each producer in the list of producer candidates is capable of being a lead producer. The journal service retrieves 704 fitness scores for each producer in the list of producer candidates. In some examples, the fitness scores for each producer are determined in accordance with the process shown and described in FIG. 6.

At block 706, the journal service identifies the lead consumer corresponding to the particular named production cursor. The journal service determines a journal-entry consumption capacity for the lead consumer. In some examples, the journal-entry consumption capacity is determined based at least in part on a fitness score of the lead consumer. In another example, the journal-entry consumption capacity is determined by measuring an amount of time used by the lead consumer to process a known number of journal entries.

At block 708, the journal service initializes a loop variable N which represents a number of selected lead producers. At block 710, the journal service evaluates the producers in the list of producer candidates, and identifies the N highest-performing producer candidates using the fitness score of each producer candidate. The journal service determines a total journal-entry production capacity for the N highest-performing producer candidates. At decision block 712, the journal service compares the total journal-entry production capacity to the journal-entry consumption capacity of the lead consumer. If the combined journal-entry production capacity of the N highest-performing producers is less than the journal-entry consumption capacity of the lead consumer, execution proceeds to block 714, and the journal service increases the number of lead producers by incrementing the loop variable N, and proceeds to block 710 where the balance of consumer and producer capacities is reevaluated. If the combined journal-entry production capacity of the N highest-performing producers is not less than the journal-entry consumption capacity of the lead consumer, execution advances to block 716 where the journal service grants lead producer status to the N highest-performing producers. At block 718, the journal service denies lead producer status to the remaining producer candidates, and sends the remaining producer candidates a notification indicating that lead producer status has been denied.

Figure 8:
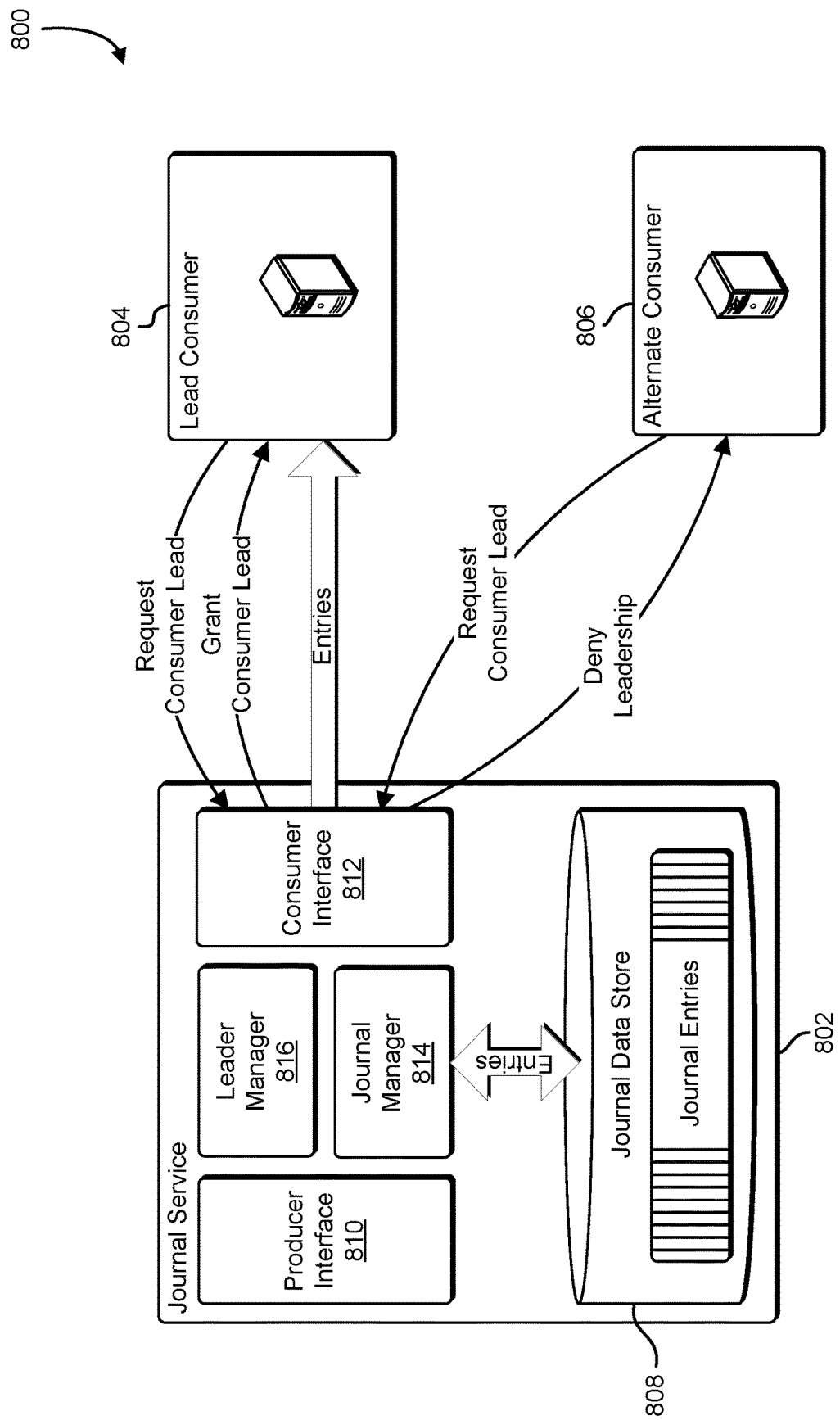
FIG. 8 shows an illustrative example of a journal service that selects a lead consumer from a number of potential consumers.

FIG. 8 shows an illustrative example of a journal service that selects a lead consumer from a number of potential consumers. A block diagram 800 shows a journal service 802, a lead consumer 804, and an alternate consumer 806. The journal service 802 maintains a journal in a journal data store 808. The journal data store 808 may be maintained in volatile or nonvolatile memory such as semiconductor RAM, flash memory, disk storage, or rewritable optical storage. In some examples, the journal is maintained in linearly addressable memory, and one or more cursors are maintained as pointers to locations within the linearly addressable memory. In another example, the journal is maintained in an ordered linked list, and one or more cursors are maintained as pointers to individual entries in a linked list. In yet another example, the journal is maintained in a database table by a database engine, and named cursors indicating locations within the database table are maintained by the database engine. The journal service 802 implements a producer interface 810 and a consumer interface 812. The producer interface 810 provides an interface to producers and alternate producers for submitting journal entries and, if necessary, managing the selection of a lead producer from a number of potential lead producers. The consumer interface 812 provides an interface to consumers and alternate consumers for retrieving journal entries and, if necessary, managing the selection of the lead consumer from a number of potential lead consumers.

The journal service 802 includes a journal manager 814 that maintains the journal in the journal data store 808. The journal manager 814 also maintains a collection of named cursors. The collection of named cursors may include named producer cursors and named consumer cursors. The journal manager 814 interacts with the producer interface 810 and the consumer interface 812 to retrieve journal entries requested by consumers and store journal entries provided by producers. When a consumer submits a request by the consumer interface 812, the consumer specifies a particular named cursor as part of the request. The consumer interface 812 forwards the request to the journal manager 814, and based on the named cursor identified by the consumer, the journal manager 814 retrieves a particular journal entry from the journal data store 808. The journal manager 814 returns the journal entry to the consumer via the consumer interface 812. The consumer returns a confirmation to the journal service 802 which is received by the journal manager 814. As a result of receiving the confirmation from the consumer, the journal manager 814 advances the named cursor in preparation for the next consumer request. When a producer submits a journal entry via the producer interface 810, the producer identifies a particular named production cursor. The producer interface 810 forwards the request to the journal manager 814, and the journal manager 814 adds the journal entry to the journal maintained in the journal data store 808. The new journal entry is stored at a location indicated by the named production cursor. The journal manager 814 updates the named production cursor and returns a confirmation to the producer via the producer interface 810.

The journal service 802 includes a leader manager 816. The leader manager 816 coordinates the selection of a lead producer and a lead consumer from a set of potential lead producers and a set of potential lead consumers. The leader manager 816 communicates with producers and consumers via the producer interface 810 and the consumer interface 812. Once a leader has been established for a particular named cursor, the leader manager 816 authorizes requests from the established leader relating to the particular named cursor, and rejects requests relating to the particular named cursor from other consumers and producers.

In the example shown in FIG. 8, the lead consumer 804 submits a leadership request to the journal service 802 by the consumer interface 812. The leadership request identifies a particular named consumer cursor. The leader manager 816 receives the leadership request, and determines whether the leadership request should be granted. In some examples, the leader manager 816 grants a request for leadership when there is no current lead consumer associated with the requested named cursor. In additional examples, the leader manager 816 grants a request for leadership when the requesting consumer is preferred to the currently assigned lead consumer. In the example shown in FIG. 8, the leader manager 816 grants the leadership request, and confirms the grant of the request by sending a confirmation to the lead consumer 804. After being granted leadership, the lead consumer 804 is able to submit requests for journal entries to the journal service 802 and, in response, the journal service 802 is able to provide one or more journal entries to the lead consumer 804.

After the lead consumer 804 has been granted leadership in association with a particular named consumer cursor, leadership requests associated with the particular named cursor that originate from other consumers will generally be denied. If, for example, after leadership has been granted to the lead consumer 804, the alternate consumer 806 submits a leadership request to the journal service 802, and the leadership request identifies the same consumer cursor as the leadership request submitted by the lead consumer 804, the journal service 802 will deny the leadership request from the alternate consumer 806. If the alternate consumer 806 requests a journal entry from the journal service 802 using the particular named cursor, journal entries will not be provided by the journal service 802 to the alternate consumer 806.

Figure 9:
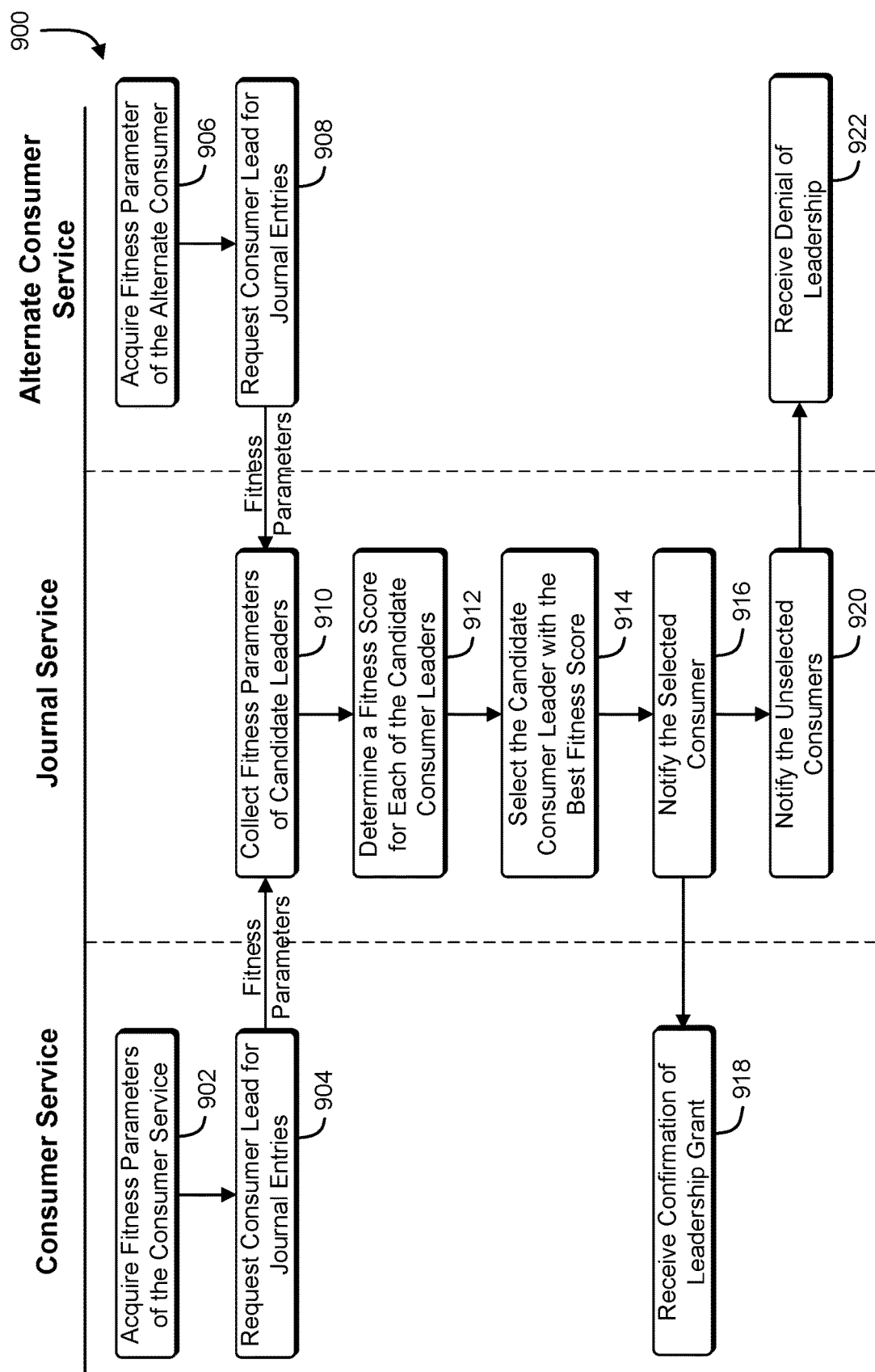
FIG. 9 shows an illustrative example of a process that, as a result of being performed by a journal service in coordination with a consumer service and an alternate consumer service, selects the consumer service as a lead consumer service.

FIG. 9 shows an illustrative example of a process that, as a result of being performed by a journal service in coordination with a consumer service and an alternate consumer service, selects the consumer service as a lead consumer service. A swim diagram 900 illustrates a process that begins at block 902 with a consumer service collecting a set of fitness parameters. The set of fitness parameters includes information that may be used by a journal service to determine effectiveness of the consumer service as a lead consumer. The set of fitness parameters may include parameters associated with the host of the consumer service such as an amount of installed memory, an amount of free memory, an amount of available disk space, a number of processors, a processor speed, a reliability measure, and an amount of available network bandwidth. Additional fitness parameters may include a geographical location of the host computer system of the consumer service, a computer subnet to which the consumer service is connected, and an identity of a computing service provider responsible for hosting the consumer service. At block 904, the consumer service submits a leadership request to the journal service. The leadership request includes the set of fitness parameters, and a name that identifies a consumer cursor for a journal maintained by the journal service.

At block 906, an alternate consumer service collects a set of alternate fitness parameters. The alternate set of fitness parameters includes information that may be used by the journal service to determine the effectiveness of the alternate consumer service as a lead consumer. The set of alternate fitness parameters may include parameters associated with the host of the alternate consumer service such as those mentioned above. Additional alternate fitness parameters may include the geographical location of the alternate consumer service, the cost of operation, a computer subnet to which the alternate consumer service is connected, and the identity of a computing service which provides hosting of the alternate consumer service. At block 908, the alternate consumer service submits a leadership request to the journal service. The leadership request includes the set of alternate fitness parameters and a name that identifies a consumer cursor maintained by the journal service.

At block 910, the journal service receives both a request from the consumer service and a request from the alternate consumer service. The journal service collects the fitness parameters provided by each consumer. At block 912, the journal service determines a fitness score for each consumer using the fitness parameters supplied by each consumer. The fitness score is a measure that provides a relative indication of the capabilities of each consumer as a lead consumer. The determination of a fitness score may use some, all, or none of the fitness parameters provided by the consumers. In some examples, the journal service uses additional information related to the consumers to generate the fitness scores.

In some examples, the journal service submits a challenge to each consumer. The challenge may be submitted in the form of executable instructions that cause each consumer to perform a task and return results to the journal service. The journal service measures an amount of time required by each consumer to perform the task, and uses the amount of time to determine a capability score for each consumer. In some examples, the journal service uses the results returned by each consumer to determine the capability score of each consumer. In another example, the journal service temporarily grants leadership to each consumer in a set of consumers, and measures the performance of each consumer during a trial period. The measured performance of each consumer is used to generate a fitness score for each consumer.

At block 914, based at least in part on the fitness score of each consumer, the journal service selects a consumer from the set of consumers that have submitted leadership requests. In many examples, a larger fitness score indicates greater fitness for leadership, and the journal service selects a consumer having the highest fitness score. After a lead consumer has been selected, the journal service notifies 916 the selected consumer that the leadership request of the selected consumer has been granted. In the example shown in FIG. 9, the consumer service receives 918 a confirmation from the journal service that the leadership request of the consumer service has been granted. At block 920, the journal service notifies non-selected consumers that their respective leadership requests have been denied. At block 922, the alternate consumer service receives an indication that the leadership request submitted by the alternate consumer service has been denied.

Figure 10:
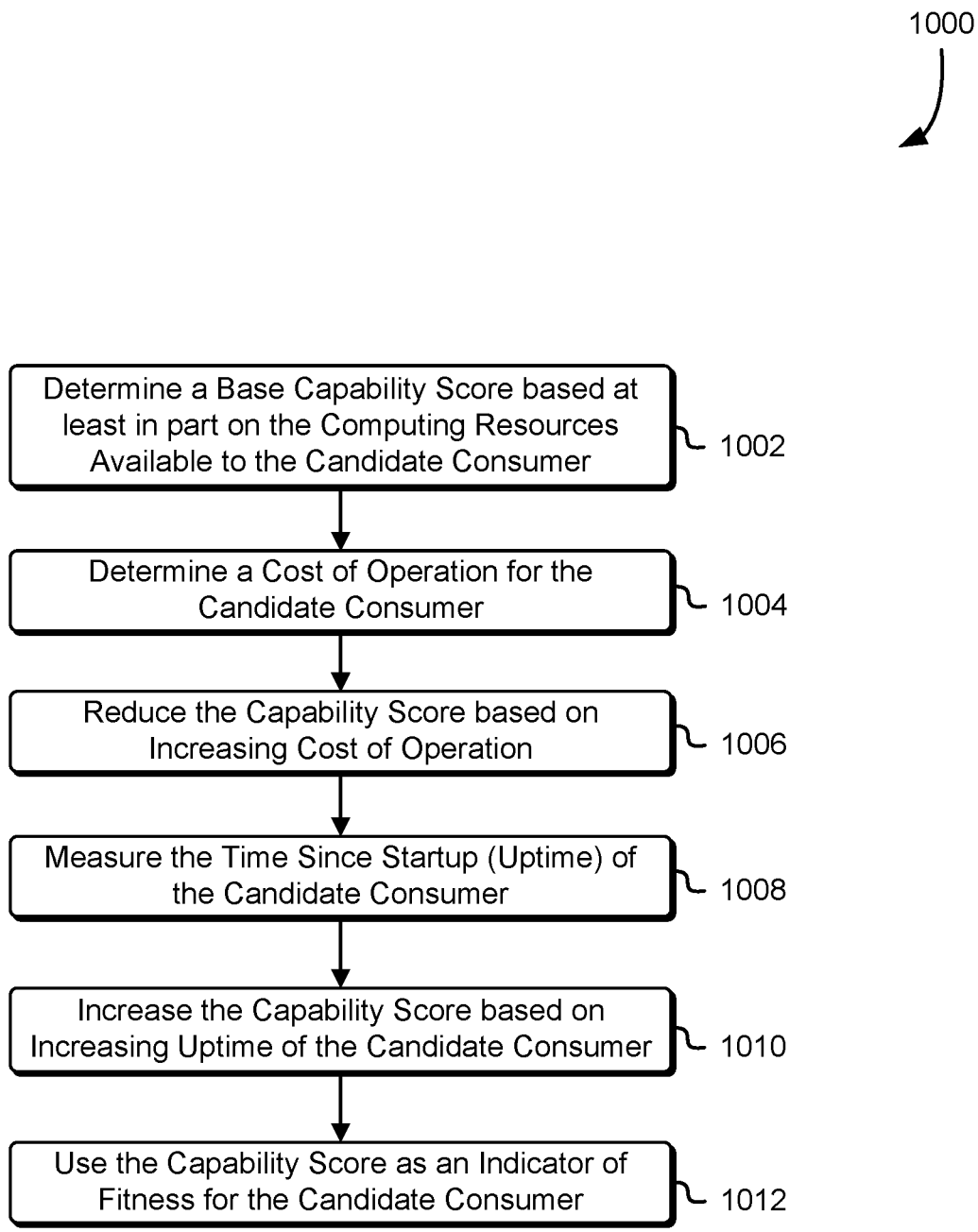
FIG. 10 shows an illustrative example of a process that, as a result of being performed by a journal service, determines a lead capability score for a consumer of journal entries.

FIG. 10 shows an illustrative example of a process that, as a result of being performed by a journal service, determines a lead capability score for a consumer of journal entries. A flowchart 1000 shows a process that begins at block 1002 with a journal service determining a base capability score for a candidate consumer. The base capability score is determined based at least in part on computing resources that are available for use by the candidate consumer. The candidate consumer is hosted by a host computer system and, in many examples, the base capability score is determined by measuring amounts of computing resources associated with the host computer system and combining the measured amounts into a single scaler value. The amounts of computing resources may include an amount of RAM, an amount of disk space, a processor speed, a number of processors, and an amount of available network bandwidth. In some examples, the base capability score is determined by modifying the amount of each computing resource by the weight factor and adding the modified amounts to produce a single scaler value.

At block 1004, the journal service determines a cost of operation for the candidate consumer. If the candidate consumer is hosted by a single dedicated host computer system, the cost of operation for the candidate consumer is equal to the cost of operation of the dedicated host. If the host of the candidate consumer is shared with other consumers or other processes, the cost of operation for the candidate consumer is the fraction of the cost of operation of the host computer system attributable to the operation of the candidate consumer. In some implementations, the candidate consumer is hosted on a computing service, and the cost of operation includes fixed and variable portions. Based on the determined cost of operation, the journal service modifies 1006 the capability score. In many examples, the journal service reduces the capability score as the determined cost of operation is increased.

At block 1008, the journal service measures an amount of elapsed time since the startup of the candidate consumer (uptime). In some examples, the candidate consumer records a time associated with the initialization of the consumer service. The journal service queries the candidate consumer for the recorded initialization time, and determines the uptime of the candidate consumer by determining the difference between the recorded initialization time and the current time. At block 1010, the journal service modifies the capability score based on the measured uptime of the candidate consumer. A greater measured uptime produces a higher capability score than a lowered measured uptime. In some examples, the uptime is scaled and added to the capability score. In another example, if the uptime is lower than a threshold value, the capability score is reduced. In some implementations, a reliability measure is used in place of uptime. The reliability measure may include a health score of a host system associated with the candidate consumer, or a number of unplanned resets performed by the host system within a period of time.

At block 1012, the capability score is used by the journal service as an indicator of fitness for the candidate consumer. The capability score may be compared to a capability score associated with other candidate consumers to select a particular candidate consumer as a lead consumer.

Figure 11:
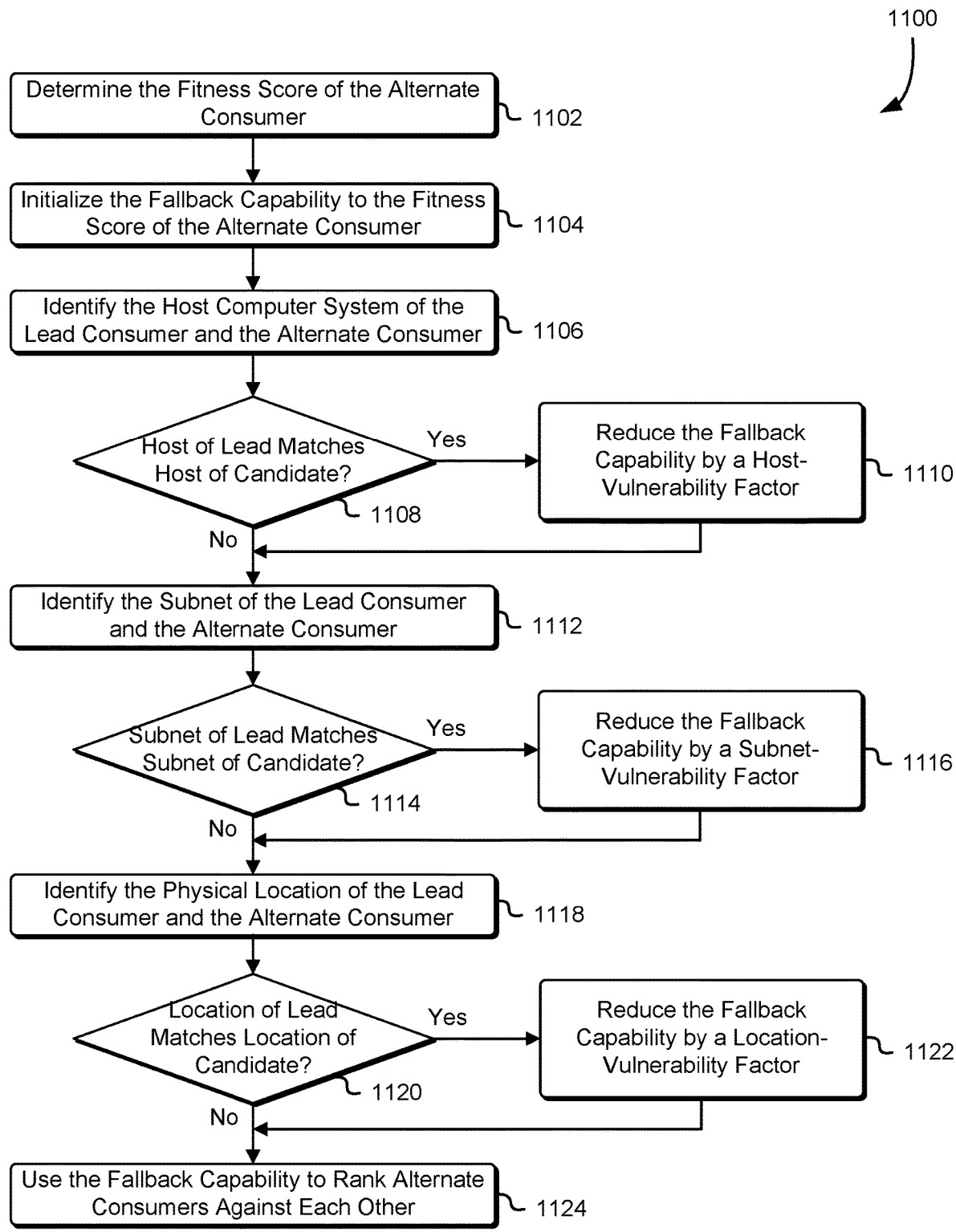
FIG. 11 shows an illustrative example of a process that, as a result of being performed by a journal service, determines a fallback capability score for a consumer of journal entries.

FIG. 11 shows an illustrative example of a process that, as a result of being performed by a journal service, determines a fallback capability score for a consumer of journal entries. A lead capability score for a particular consumer is a metric that characterizes the ability of the particular consumer to act as a lead consumer. A fallback capability score for a particular consumer is a metric that characterizes the ability of the particular consumer to act as an alternate consumer if the lead consumer fails. A flowchart 1100 illustrates a process for determining a fallback fitness score based at least in part on a lead fitness score. The process begins at block 1102 with a journal service determining a lead fitness score for an alternate consumer. The lead fitness score may be determined using the process described in FIG. 10. At block 1104, the initial value of the fallback capability score is set to the lead fitness score of the alternate consumer. The remainder of the process modifies the fallback capability score based on shared vulnerabilities of the alternate consumer and the current lead consumer.

At block 1106, the journal service identifies the host computer system that hosts the lead consumer and the host computer system that hosts the alternate consumer. At decision block 1108, the journal service compares the host computer system of the lead consumer with the host computer system of the alternate consumer. If the lead consumer and the alternate consumer are hosted by the same host computer system, execution advances to block 1110, and the journal service reduces the fallback capability by applying a host-vulnerability factor to the current fallback capability, and execution continues at block 1112. If the lead consumer and the alternate consumer are not hosted by the same host computer system, execution advances to block 1112 without modifying fallback capability.

At block 1112, the journal service identifies a network subnet associated with the lead consumer and a network subnet associated with the alternate consumer. The network subnet associated with the lead consumer is the network subnet to which the host of the lead consumer is connected. The network subnet associated with the alternate consumer is the network subnet connected to the host of the alternate consumer. At decision block 1114, the journal service compares the subnet of the lead consumer with the subnet of the alternate consumer. If the subnet of the lead consumer matches the subnet of the alternate consumer, execution advances to block 1116, and the journal service reduces the fallback capability by applying a subnet-vulnerability factor to the current fallback capability. In some examples, the subnet-vulnerability factor is a fraction between zero and one, and the subnet-vulnerability factor is applied by multiplying the subnet-vulnerability factor by the current fallback capability. If the subnet of the lead consumer does not match the subnet of the alternate consumer, execution proceeds to block 1118 without modifying the current fallback capability.

At block 1118, the journal service identifies a physical location associated with the lead consumer and a physical location associated with the alternate consumer. The physical location of the lead consumer and the alternate consumer may be identified using network information or wireless location services associated with the hosts of the lead consumer and the alternate consumer. At block 1120, the journal service compares the location of the lead consumer with the location of the candidate consumer. If the location of the lead consumer is within a threshold distance of the location of the candidate consumer, execution proceeds to block 1122 and the fallback capability is reduced by a location-vulnerability factor. In some examples, the fallback capability is reduced based on the distance between the lead consumer and the alternate consumer. Smaller distances between the lead consumer and the alternate consumer cause a greater reduction in fallback capability than larger distances between the lead consumer and the alternate consumer. If the location of the lead consumer is not within a threshold distance of the location of the candidate consumer, execution advances to block 1124 without modifying the fallback capability.

At block 1124, the fallback capability is determined, and the journal service may use the fallback capability to rank the alternate consumer against other alternate consumers. In some implementations, alternate consumers are ordered using their respective fallback capabilities, and the alternate consumer having the highest fallback capability is selected if the lead consumer fails. In another implementation, alternate consumers having a fallback capability below a threshold value are removed from a alternate consumer pool and are not available as alternate consumers.

Figure 12:
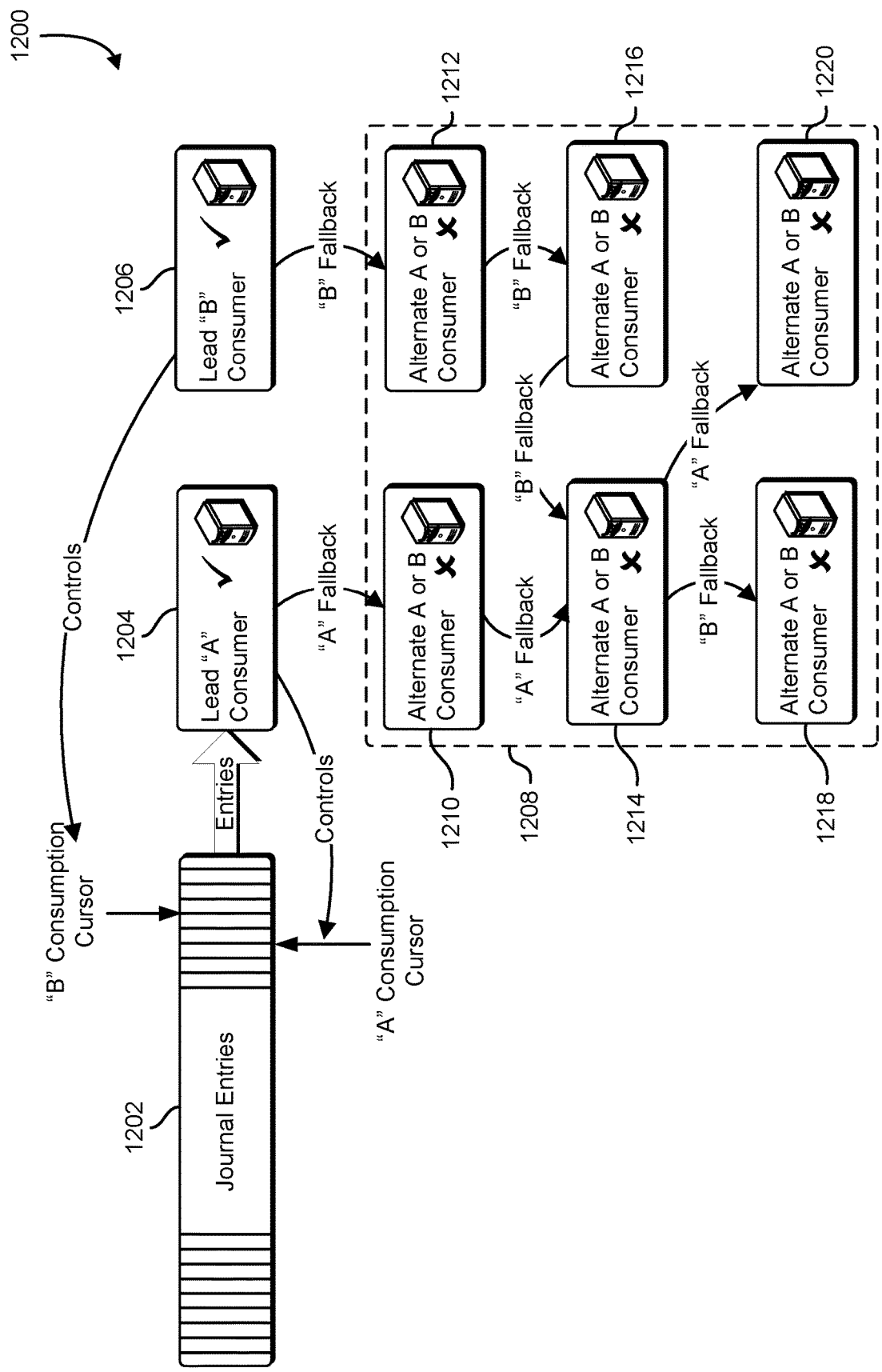
FIG. 12 shows a journal service that selects an alternative consumer for a particular named cursor from a pool of alternative consumers that are capable of consuming from a plurality of different named cursors.

FIG. 12 shows a journal service that selects an alternative consumer for a particular named cursor from a pool of alternative consumers that are capable of consuming from a plurality of different named cursors. A diagram 1200 shows a journal 1202 that provides journal entries to a first lead consumer 1204. The journal entries are identified using a consumption cursor with an associated name of 'A.' A second lead consumer 1206 is the lead consumer for a second consumption cursor with an associated name of 'B.'

Alternate consumers for both the first lead consumer 1204 and the second lead consumer 1206 are selected from a pool of alternate consumers 1208. The pool of alternate consumers 1208 includes a first alternate consumer 1210, a second alternate consumer 1212, a third alternate consumer 1214, a fourth alternate consumer 1216, a fifth alternate consumer 1218, and a sixth alternate consumer 1220. The alternate consumers in the pool of alternate consumers 1208 are capable of processing journal entries from either the 'A' cursor or the 'B' cursor. As a result, the alternate consumers in the pool of alternate consumers are able to act as alternate consumers for either the first lead consumer 1204 and/or the second lead consumer 1206. In the example shown in FIG. 12, the journal service maintains a first set of fallback links for the first lead consumer 1204, and a second set of fallback links for the second lead consumer 1206. The first set of fallback links defines a fallback sequence for the first lead consumer 1204 comprising the first alternate consumer 1210, then the third alternate consumer 1214, then the sixth alternate consumer 1220. The second set of fallback links defines a fallback sequence for the second lead consumer 1206 comprising the second alternate consumer 1212, then the fourth alternate consumer 1216, then the third alternate consumer 1214, and then the fifth alternate consumer 1218. Maintaining alternate resources in a pool of alternate resources may increase the reliability and stability of the computer system while holding fewer alternate consumers in a reserve capacity.

If the lead consumer fails, an alternate resource from the pool of alternate consumers 1208 is promoted to replace the lead consumer. The promotion of the alternate resource precludes the use of the alternate resource as an alternate resource for the remaining lead consumers, and the fallback sequences incorporating the promoted alternate resource are modified accordingly.

Figure 13:
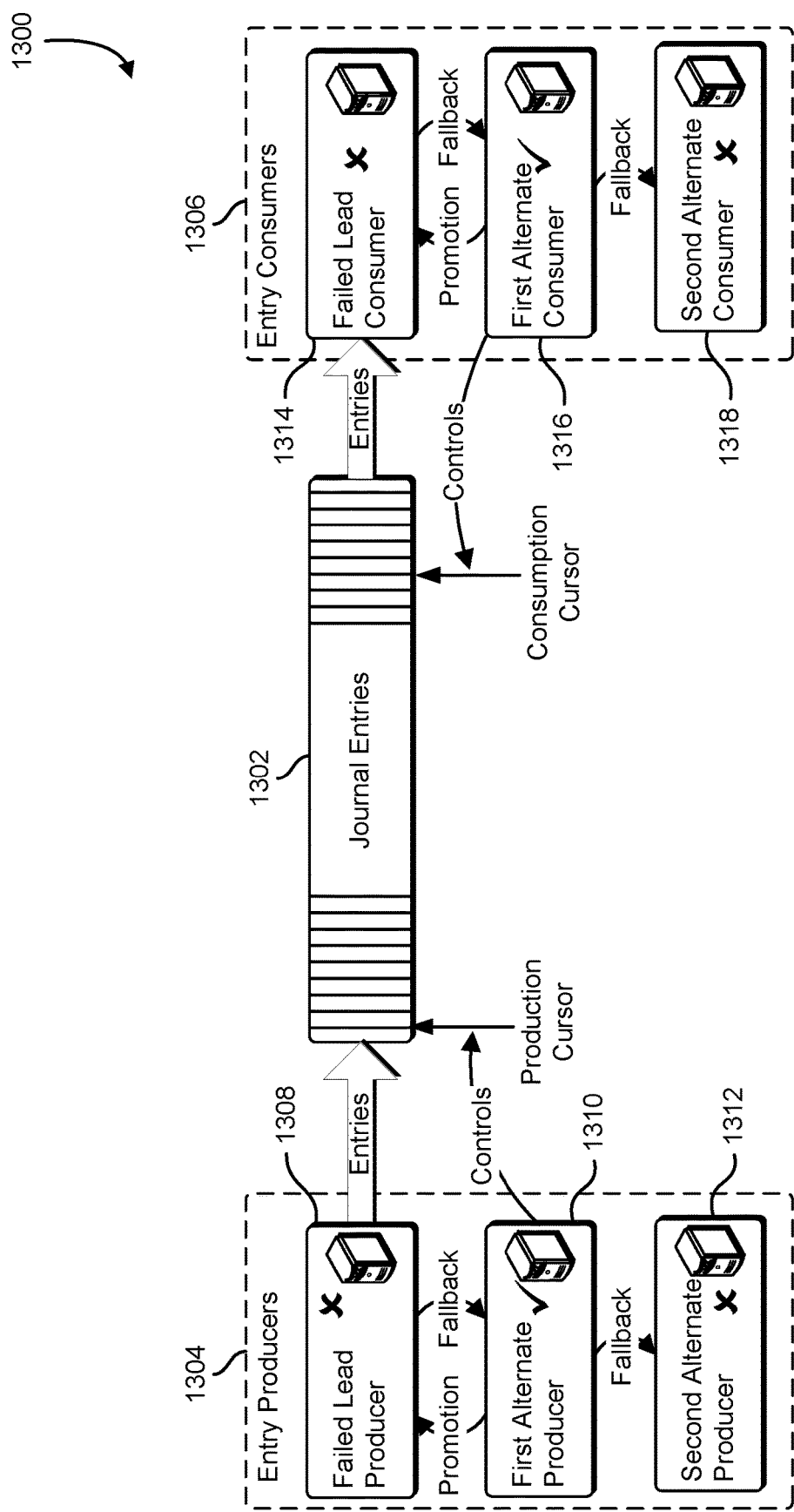
FIG. 13 shows a journal service that replaces a lead producer or a lead consumer with a an alternate producer or consumer.

FIG. 13 shows a journal service that replaces a lead producer or a lead consumer with an alternate producer or consumer. A diagram 1300 shows a journal 1302, a set of producers 1304, and a set of consumers 1306. The set of producers 1304 includes a lead producer 1308, a first alternate producer 1310, and a second alternate producer 1312. The set of consumers 1306 includes a lead consumer 1314, a first alternate consumer 1316, and a second alternate consumer 1318. Initially, the journal 1302 accepts journal entries from the lead producer 1308 and provides journal entries to the lead consumer 1314.

In the example shown in FIG. 13, the journal service detects an impeachment event that causes the journal service to replace the lead producer 1308 with an alternate producer. In some examples, the impeachment event is the failure of the lead producer. In another example, the impeachment event is a substantial decline in the performance of the lead producer. In yet another example, the impeachment event is the availability of an alternate producer that is superior to the lead producer in some respect. The alternate producer may be superior to the lead producer in terms of potential performance, cost, or reliability. The journal service replaces the lead producer 1308 by revoking the leadership of the lead producer 1308, and notifying the lead producer 1308 that leadership has been revoked. The journal service selects an alternate producer from the set of producers 1304, promotes the selected producer to the lead producer, and notifies the selected producer that leadership has been granted. If the lead producer 1308 acknowledges the loss of leadership, the lead producer 1308 is returned to the set of producers 1304 as an alternate producer. If the lead producer 1308 does not acknowledge the loss of leadership, the lead producer 1308 is removed from the set of producers and may not act as an alternate producer.

In the example shown in FIG. 13, the journal service also detects another impeachment event that causes the journal service to replace the lead consumer 1314 with an alternate consumer. The impeachment event may be the failure of the lead consumer, a substantial reduction in performance of the lead consumer, or the availability of superior alternate consumer. The journal service replaces the lead consumer 1314 by revoking the leadership of the lead consumer 1314, and notifying the lead consumer 1314 that leadership has been revoked. If the lead consumer 1314 acknowledges the loss of leadership, the lead consumer 1314 is retained in the set of consumers as an alternate consumer. If the lead consumer 1314 does not acknowledge loss of leadership, the lead consumer 1314 is removed from the set of consumers and is not available as an alternate consumer. The journal service selects an alternate consumer from the set of consumers 1306, and promotes the selected alternate consumer to the lead consumer. The selected alternate consumer is notified that leadership is granted and, as a result, may request and receive journal entries from the journal 1302.

Figure 14:
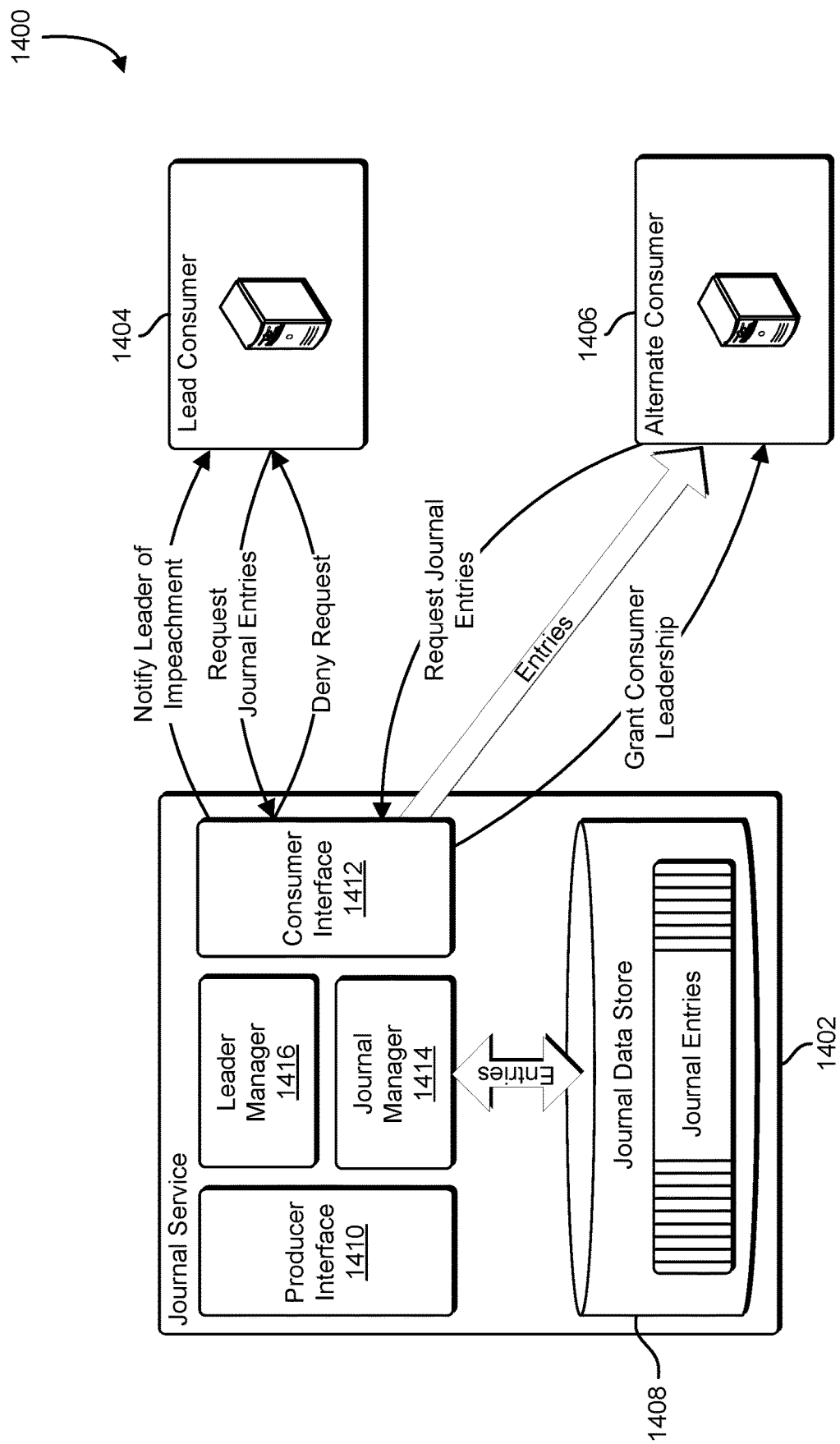
FIG. 14 shows a block diagram of a journal service that, as a result of determining that a lead consumer is unfit, replaces the lead consumer with an alternative consumer.

FIG. 14 shows a block diagram of a journal service that, as a result of determining that a lead consumer is unfit, replaces the lead consumer with an alternative consumer. A block diagram 1400 shows a journal service 1402, a lead consumer 1404, and an alternate consumer 1406. The journal service 1402 maintains a journal in a journal data store 1408. The journal data store 1408 may be maintained in volatile or nonvolatile memory such as semiconductor RAM, flash memory, disk storage, or rewritable optical storage. In some examples, the journal is maintained in linearly addressable memory, and one or more cursors are maintained as pointers to locations within the linearly addressable memory. In another example, the journal is maintained as an ordered linked list, and one or more cursors are maintained as pointers to individual entries in a linked list. In yet another example, the journal is maintained in a database table by a database engine, and named cursors indicating locations within the database table are maintained by the database engine. The journal service 1402 implements a producer interface 1410 and a consumer interface 1412. The producer interface 1410 provides an interface to producers and alternate producers for submitting journal entries and, if necessary, managing the selection of a lead producer from a number of potential lead producers. The consumer interface 1412 provides an interface to consumers and alternate consumers for retrieving journal entries and, if necessary, managing the selection of the lead consumer from a number of potential lead consumers.

The journal service 1402 includes a journal manager 1414 that maintains the journal in the journal data store 1408. The journal manager 1414 also maintains a collection of named cursors. The collection of named cursors may include named producer cursors and named consumer cursors. The journal manager 1414 interacts with the producer interface 1410 and the consumer interface 1412 to retrieve journal entries requested by consumers and store journal entries provided by producers. When a consumer submits a request by the consumer interface 1412, the consumer specifies a particular named cursor as part of the request. The consumer interface 1412 forwards the request to journal manager 1414, and based on the named cursor identified by the consumer, the journal manager 1414 retrieves a particular journal entry from the journal data store 1408. The journal manager 1414 returns the journal entry to the consumer via the consumer interface 1412. The consumer returns a confirmation to the journal service 1402 which is received by the journal manager 1414. As a result of receiving the confirmation from the consumer, the journal manager 1414 advances the named cursor in preparation for the next consumer request. When a producer submits a journal entry via the producer interface 1410, the producer identifies a particular named production cursor. The producer interface 1410 forwards the request to the journal manager 1414, and the journal manager 1414 adds the journal entry to the journal maintained in the journal data store 1408. The new journal entry is stored at a location indicated by the named production cursor. The journal manager 1414 updates the named production cursor and returns a confirmation to the producer via the producer interface 1410.

The journal service 1402 includes a leader manager 1416. The leader manager 1416 coordinates the selection of a lead producer and a lead consumer from a set of potential lead producers and a set of potential lead consumers. The leader manager 1416 communicates with producers and consumers via the producer interface 1410 and the consumer interface 1412. Once a leader has been established for a particular named cursor, the leader manager 1416 authorizes requests from the established leader relating to the particular named cursor, and rejects requests relating to the particular named cursor from other consumers and producers.

When the journal service 1402 detects an impeachment condition, the leader manager 1416 sends a notification via the consumer interface 1412 to the lead consumer 1404 indicating that the lead consumer 1404 is being impeached by the journal service 1402. In some examples, if the lead consumer 1404 receives the notification and is able to respond, the lead consumer 1404 sends a confirmation to the journal service 1402. The confirmation may allow the journal service to return the lead consumer 1404 to a pool of alternate resources. If the lead consumer 1404 submits a request for journal entries to the journal service 1402 after the journal service 1402 has impeached the lead consumer 1404, the journal service 1402 will deny the request for journal entries.

The journal service 1402 notifies the alternate consumer 1406 that leadership has been granted to the alternate consumer 1406. Notification of the alternate consumer 1406 may be accomplished by sending the alternate consumer 1406 a message, or by activating the alternate consumer 1406 if the alternate consumer 1406 is in a suspended state. As a result of having been notified, the alternate consumer 1406 may request journal entries from the journal service 1402, and the journal service 1402 may respond to the request by providing the alternate consumer 1406 with the requested journal entries.

Figure 15:
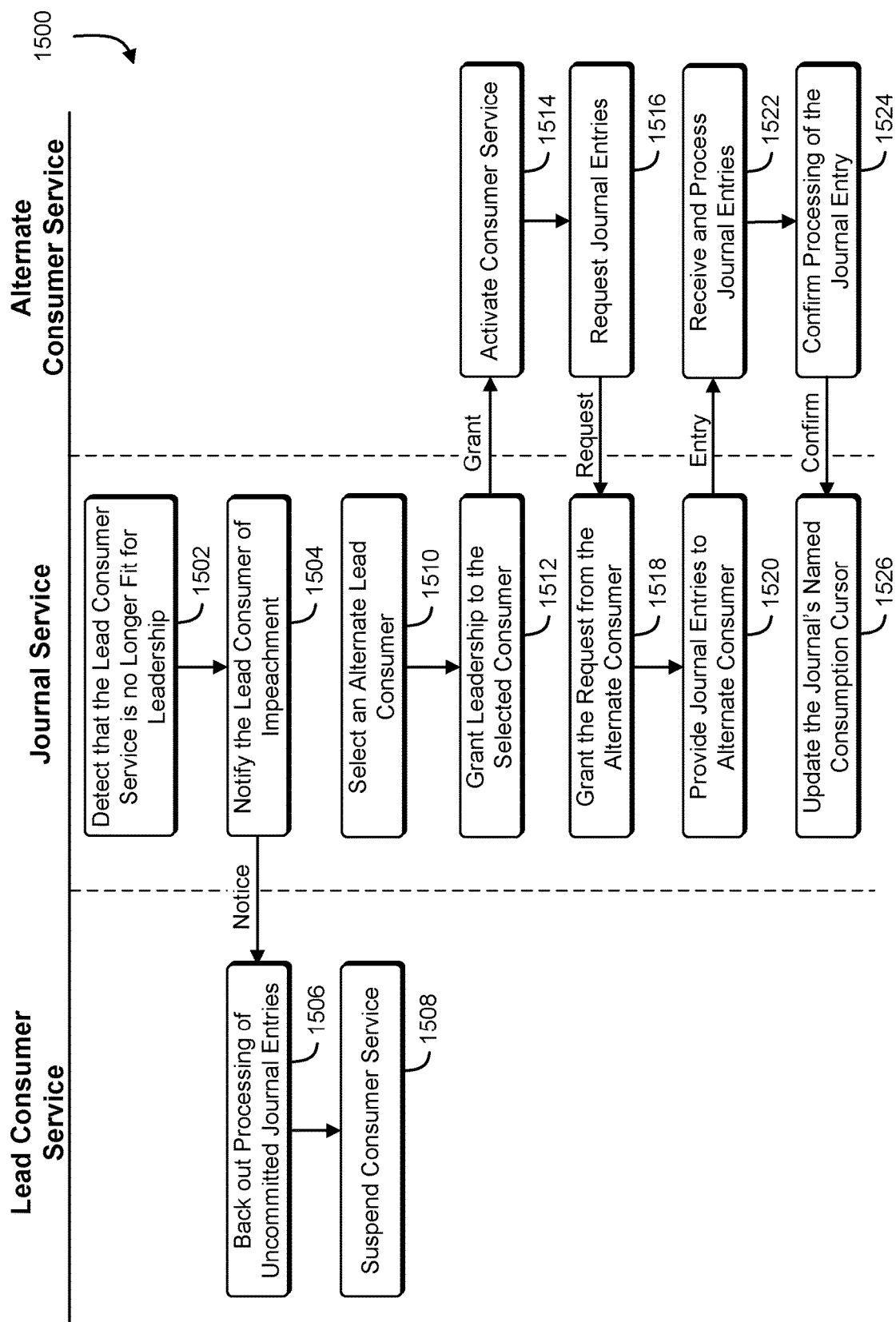
FIG. 15 shows an illustrative example of a process that, as a result of being performed by a journal service in coordination with a lead consumer service and an alternate consumer service, replaces the lead consumer service with the alternate consumer service.

FIG. 15 shows an illustrative example of a process that, as a result of being performed by a journal service in coordination with a lead consumer service and an alternate consumer service, replaces the lead consumer service with the alternate consumer service. A swim diagram 1500 illustrates a process that begins at block 1502 with a journal service detecting that a lead consumer is no longer fit for leadership. Detecting that a lead consumer is no longer fit for leadership may be accomplished in a number of ways. In some examples, the journal service stops receiving requests for journal entries for a threshold amount of time, and is unable to confirm an operational state for the lead consumer service. In another example, the journal service periodically polls the lead consumer service to confirm that the lead consumer service is operational. In yet another example, the journal service monitors a number of journal entries in the journal, and when the number of journal entries in the journal exceeds a threshold amount, the journal service infers that the lead consumer is not operating properly. As a result of detecting that a lead consumer is no longer fit for leadership, at block 1504, the journal service sends an impeachment notice to the lead consumer service.

The lead consumer service receives the impeachment notice from the journal service at block 1506, and any processing performed as a result of previously received but unconfirmed journal entries is reversed. Journal entries which have been received, and which have not been processed, are discarded. At block 1508, the lead consumer service suspends. In some examples, the lead consumer service sends a notification to the journal service that the lead consumer service is suspending. The notification may include an indication of the last journal entry processed by the lead consumer service.

At block 1510, the journal service begins the process of replacing the lead consumer by selecting an alternate lead consumer from a pool of alternate consumers. The alternate lead consumer may be selected based on a fitness score. The fitness score may be determined as described elsewhere in the current document. In some implementations, the journal service maintains an ordered list of alternate consumers and the alternate lead consumer is chosen from the beginning of the list. In the example shown in FIG. 15, the alternate consumer service is selected as the new lead consumer. At block 1512, the journal service grants leadership to the alternate consumer service, and notifies the alternate consumer service that the alternate consumer service has been appointed as the lead consumer. The alternate consumer service receives the notification from the journal service, and activates 1514 the consumer service. In some implementations, the journal service causes the alternate consumer service to be started from a suspended state. In another implementation, the journal service causes the consumer service to be restored from a hibernated state. In yet another implementation, the consumer service is in a blocking state, but otherwise active, and the journal service begins delivering journal entries to the consumer service. As a result of receiving journal entries from the journal service, the consumer service becomes active.

At block 1516, the alternate consumer service submits a request for journal entries to the journal service, specifying a particular named consumer cursor. The journal service receives the request, determines that the alternate consumer service is the authorized lead consumer for the particular named consumer cursor, and grants 1518 the request. At block 1520, the journal service locates the requested journal entries using the particular named consumer cursor, and provides the requested journal entries to the alternate consumer service. The alternate consumer service receives 1522 the journal entries, and processes the journal entries in accordance with the purpose of the alternate consumer service. After processing the journal entries, the alternate consumer service sends 1524 a confirmation of processing to the journal service. At block 1526, the journal service receives the confirmation of processing from the alternate consumer service and, as a result, updates the particular named consumer cursor to indicate that the journal entries provided to the alternate consumer service have been processed.

Figure 16:
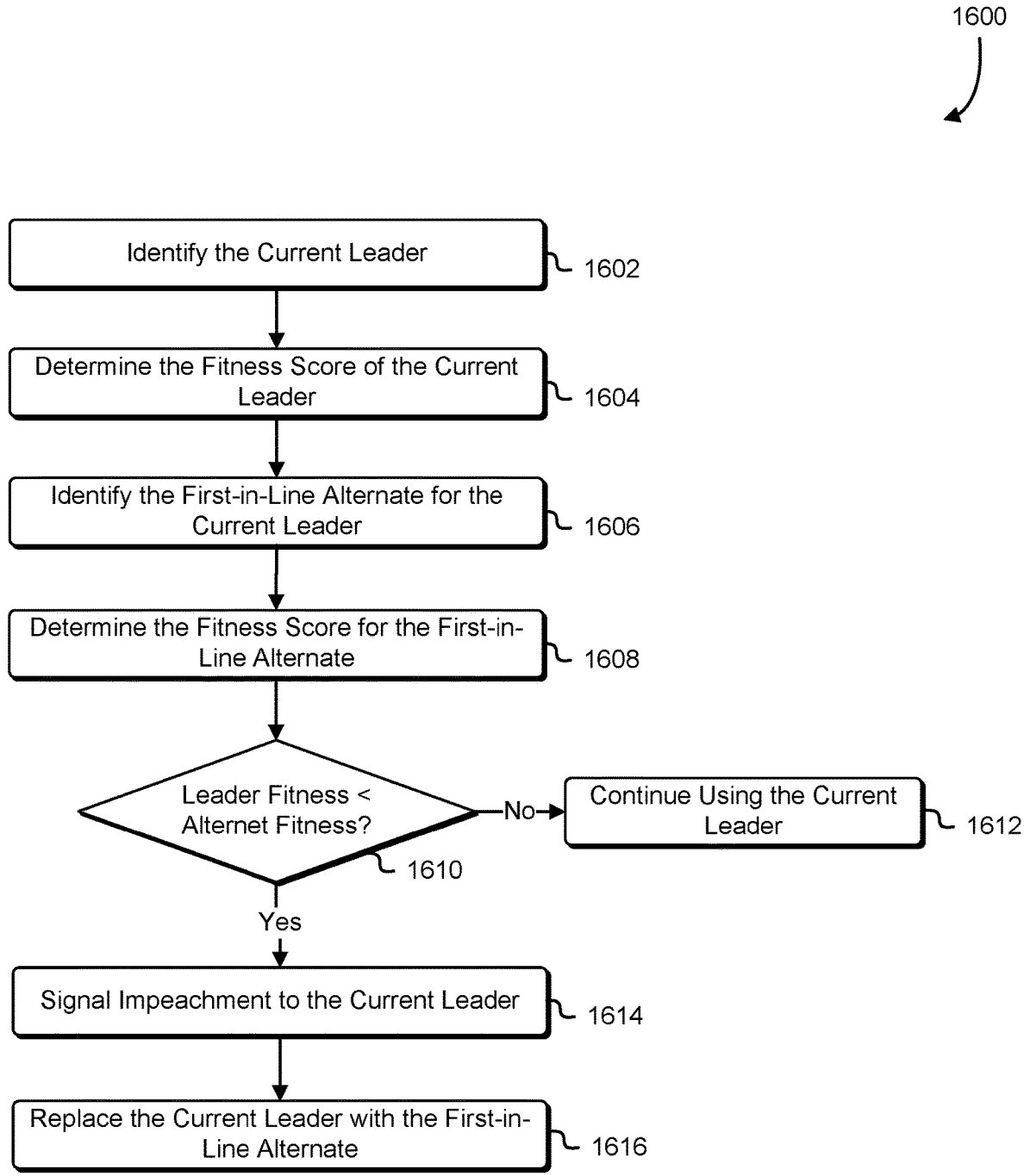
FIG. 16 shows an illustrative example of a process that, as a result of being performed by a journal service, detects the failure of a leader based at least in part on an updated fitness score of the leader.

FIG. 16 shows an illustrative example of a process that, as a result of being performed by a journal service, detects the failure of a leader based at least in part on an updated fitness score of the leader. A flowchart 1600 illustrates a process that begins at block 1602 with a journal service identifying a current leader associated with a particular cursor. The leader may be a lead producer or lead consumer. At block 1604, the journal service determines a fitness score for the current leader. The fitness score may be determined using methods described elsewhere in this document. For example, the fitness score may be based on computing resources available to the leader, or fitness score may be measured by submitting a task to the leader, and measuring the performance of the leader in performing the task. At block 1606, the journal service identifies a first-in-line alternate for the leader. In some implementations, the first-in-line alternate is determined by selecting the first entry in an ordered list of available alternates. In another implementation, the first-in-line alternate is determined by identifying a particular alternate resource from within a pool of alternate resources based at least in part on a fitness score determined for each alternate resource in the pool of alternate resources. At block 1608, the journal service determines a fitness score for the determined first-in-line alternate resource.

At decision block 1610, the journal service compares the fitness score of the current leader to the fitness score of the first-in-line alternate resource. If the fitness score of the current leader is greater than or equal to the fitness score of the first-in-line alternate resource, execution proceeds to block 1612 and the journal service maintains the current leader as the leader. If the fitness score of the current leader is less than the fitness score of the first-in-line alternate resource, execution advances to block 1614, and the journal service generates an impeachment event, and sends a signal to the current leader indicating that the current leader has been impeached. At block 1616, the journal service revokes leadership of the current leader, and grants leadership to the first-in-line alternate resource. The first-in-line alternate resource is notified that leadership has been granted and is allowed to request or provide journal entries from the journal in accordance with the particular cursor over which the first-in-line alternate resource has been granted leadership.

Figure 17:
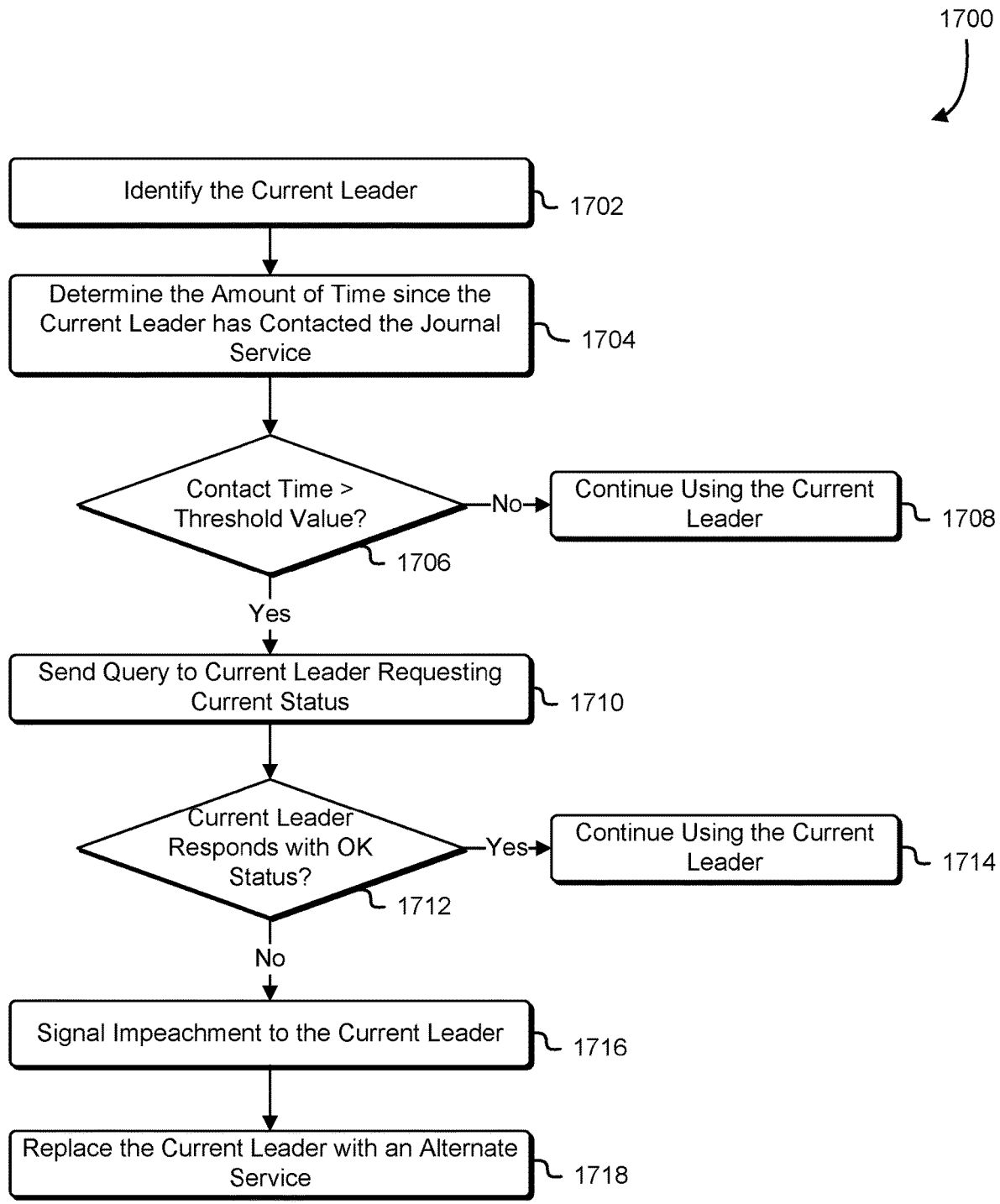
FIG. 17 shows an illustrative example of a process that, as a result of being performed by a journal service, detects the failure of a leader by polling a status of the leader.

FIG. 17 shows an illustrative example of a process that, as a result of being performed by a journal service, detects the failure of a leader by polling a status of the leader. A flowchart 1700 illustrates a process that begins at block 1702 with a journal service identifying a current leader associated with a particular cursor. The leader may be a lead consumer or lead producer. At block 1704, the journal service determines an amount of time since the leader interacted with the journal service. For example, if the leader is a consumer, the journal service determines the amount of time since the leader has requested a journal entry from the journal service. If the leader is a producer, the journal service determines the amount of time since the leader has provided a journal entry to the journal service. At decision block 1706, the journal service compares the amount of time to a threshold value. The threshold value is an amount of time during which the leader would be expected to make a request from the journal service. If the amount of time is not greater than the threshold value, execution proceeds to block 1708 and the journal service does not impeach the leader.

If the amount of time is greater than a threshold value, execution proceeds to block 1710 and the journal service sends a query to the current leader requesting a confirmation of operational status. The journal service may wait for a period of time for the leader to respond to the query before advancing to block 1712. At block 1712, the journal service evaluates the response from the leader. If the leader responds, and indicates that the leader is operational, execution advances to block 1714 and the journal service does not impeach the current leader. If the leader does not respond, or if the leader responds but indicates that the leader is failing or nonoperational as a consumer or producer, execution advances to block 1716. At block 1716, the journal service raises an impeachment event and notifies the leader that it is being impeached. At block 1718, the journal service replaces the current leader with an alternate resource as described elsewhere in the current document.

In some examples, the journal service monitors the presence of heartbeat signals transmitted by the consumers and producers. When a consumer or a producer stops sending heartbeat signals, the journal service determines that the associated consumer or producer has failed, and replaces the associated consumer or producer with an alternate resource.

Figure 18:
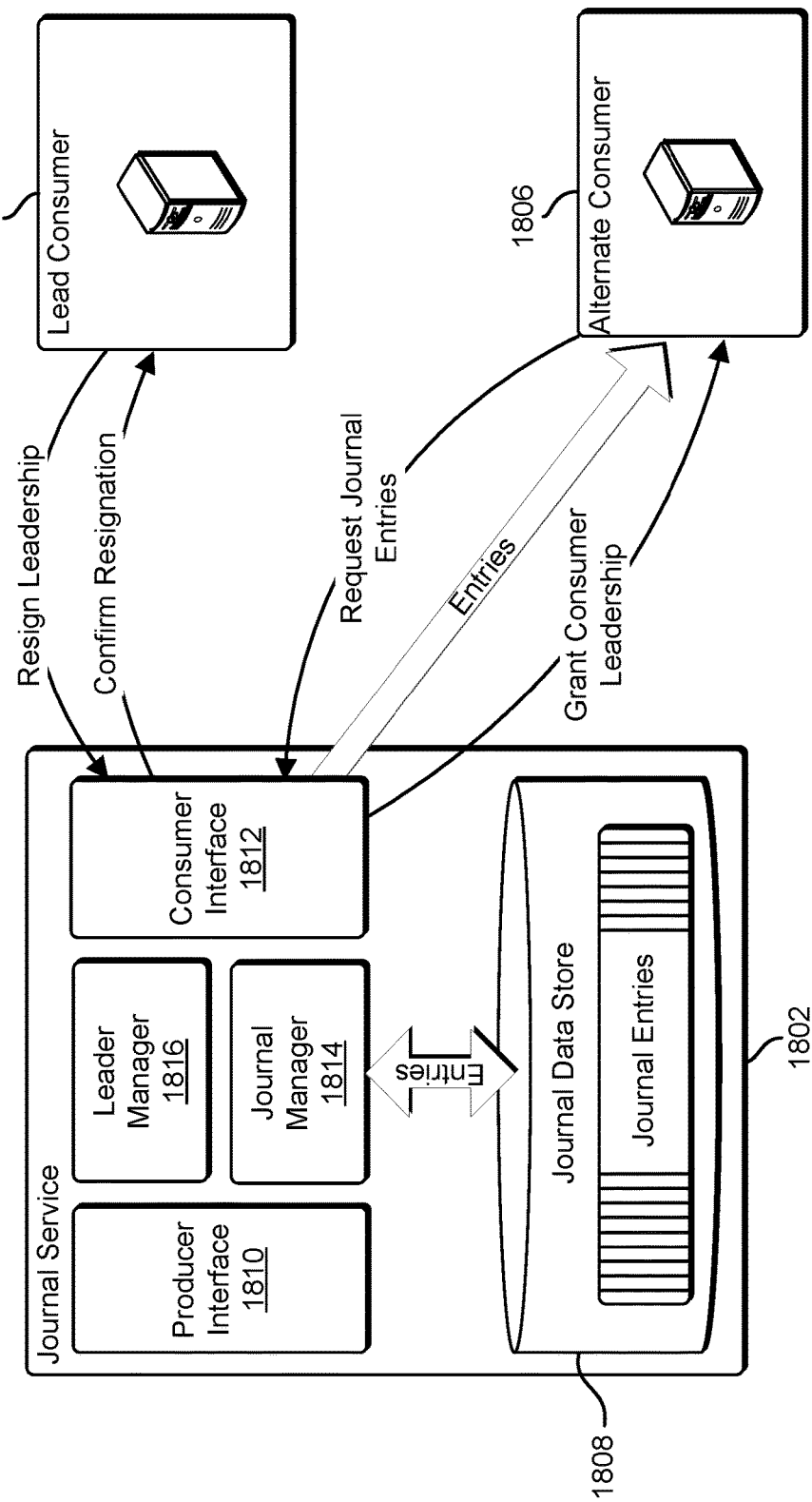
FIG. 18 shows a block diagram of a journal service that replaces the lead consumer with an alternate consumer as a result of receiving a resignation from the lead consumer.

FIG. 18 shows a block diagram of a journal service that replaces the lead consumer with an alternative consumer as a result of receiving a resignation from the lead consumer. A block diagram 1800 shows a journal service 1802, a lead consumer 1804, and an alternate consumer 1806. The journal service 1802 maintains a journal in a journal data store 1808. The journal data store 1808 may be maintained in volatile or nonvolatile memory such as semiconductor RAM, flash memory, disk storage, or rewritable optical storage. In some examples, the journal is maintained in linearly addressable memory, and one or more cursors are maintained as pointers to locations within the linearly addressable memory. In another example, the journal is maintained in an ordered linked list, and one or more cursors are maintained as pointers to individual entries in a linked list. In yet another example, the journal is maintained in a database table by a database engine, and named cursors indicating locations within the database table are maintained by the database engine. The journal service 1802 implements a producer interface 1810 and a consumer interface 1812. The producer interface 1810 provides an interface to producers and alternate producers for submitting journal entries and, if necessary, managing the selection of a lead producer from a number of potential lead producers. The consumer interface 1812 provides an interface to consumers and alternate consumers for retrieving journal entries and, if necessary, managing the selection of the lead consumer from a number of potential lead consumers.

The journal service 1802 includes a journal manager 1814 that maintains the journal in the journal data store 1808. The journal manager 1814 also maintains a collection of named cursors. The collection of named cursors may include named producer cursors and named consumer cursors. The journal manager 1814 interacts with the producer interface 1810 and the consumer interface 1812 to retrieve journal entries requested by consumers and store journal entries provided by producers. When a consumer submits a request by the consumer interface 1812, the consumer specifies a particular named cursor as part of the request. The consumer interface 1812 forwards the request to the journal manager 1814, and based on the named cursor identified by the consumer, the journal manager 1814 retrieves a particular journal entry from the journal data store 1808. The journal manager 1814 returns the journal entry to the consumer via the consumer interface 1812. The consumer returns a confirmation to the journal service 1802 which is received by the journal manager 1814. As a result of receiving the confirmation from the consumer, the journal manager 1814 advances the named cursor in preparation for the next consumer request. When a producer submits a journal entry via the producer interface 1810, the producer identifies a particular named production cursor. The producer interface 1810 forwards the request to the journal manager 1814, and the journal manager 1814 adds the journal entry to the journal maintained in the journal data store 1808. The new journal entry is stored at a location indicated by the named production cursor. The journal manager 1814 updates the named production cursor and returns a confirmation to the producer via the producer interface 1810.

The journal service 1802 includes a leader manager 1816. The leader manager 1816 coordinates the selection of a lead producer and a lead consumer from a set of potential lead producers and a set of potential lead consumers. The leader manager 1816 communicates with producers and consumers via the producer interface 1810 and the consumer interface 1812. Once a leader has been established for a particular named cursor, the leader manager 1816 authorizes requests from the established leader relating to the particular named cursor, and rejects requests relating to the particular named cursor from other consumers and producers.

In the example shown in FIG. 18, the lead consumer 1804 submits a resignation request to the journal service 1802 via the consumer interface 1812. The consumer interface 1812 forwards the request to the leader manager 1816. In response to the request, the leader manager 1816 revokes the leadership of the lead consumer 1804. In some examples, the resignation request specifies a cursor, and the lead consumer 1804 revokes the leadership with respect to the specified cursor. In another example, the resignation request does not specify a cursor, and the lead consumer 1804 revokes leadership with respect to all cursors managed by a journal service 1802. The leader manager 1816 sends a confirmation to the lead consumer 1804 via the consumer interface 1812 indicating that leadership has been revoked. If the lead consumer 1804 attempts to request journal entries that are associated with the leadership role that has been revoked, the request will be denied by the journal service 1802.

As a result of having revoked the leadership of the lead consumer 1804, the journal service 1802 selects the alternate consumer 1806 as a replacement lead consumer. The leader manager 1816 grants the leadership roles previously granted to the lead consumer 1804 to the alternate consumer 1806, and sends a notification to the alternate consumer 1806. The notification identifies the particular cursors over which the alternate consumer 1806 is being granted leadership. As a result of receiving the notification, the alternate consumer 1806 is able to request journal entries associated with the cursors over which the alternate consumer 1806 has been granted leadership, and the journal service 1802 will provide the requested journal entries.

Figure 19:
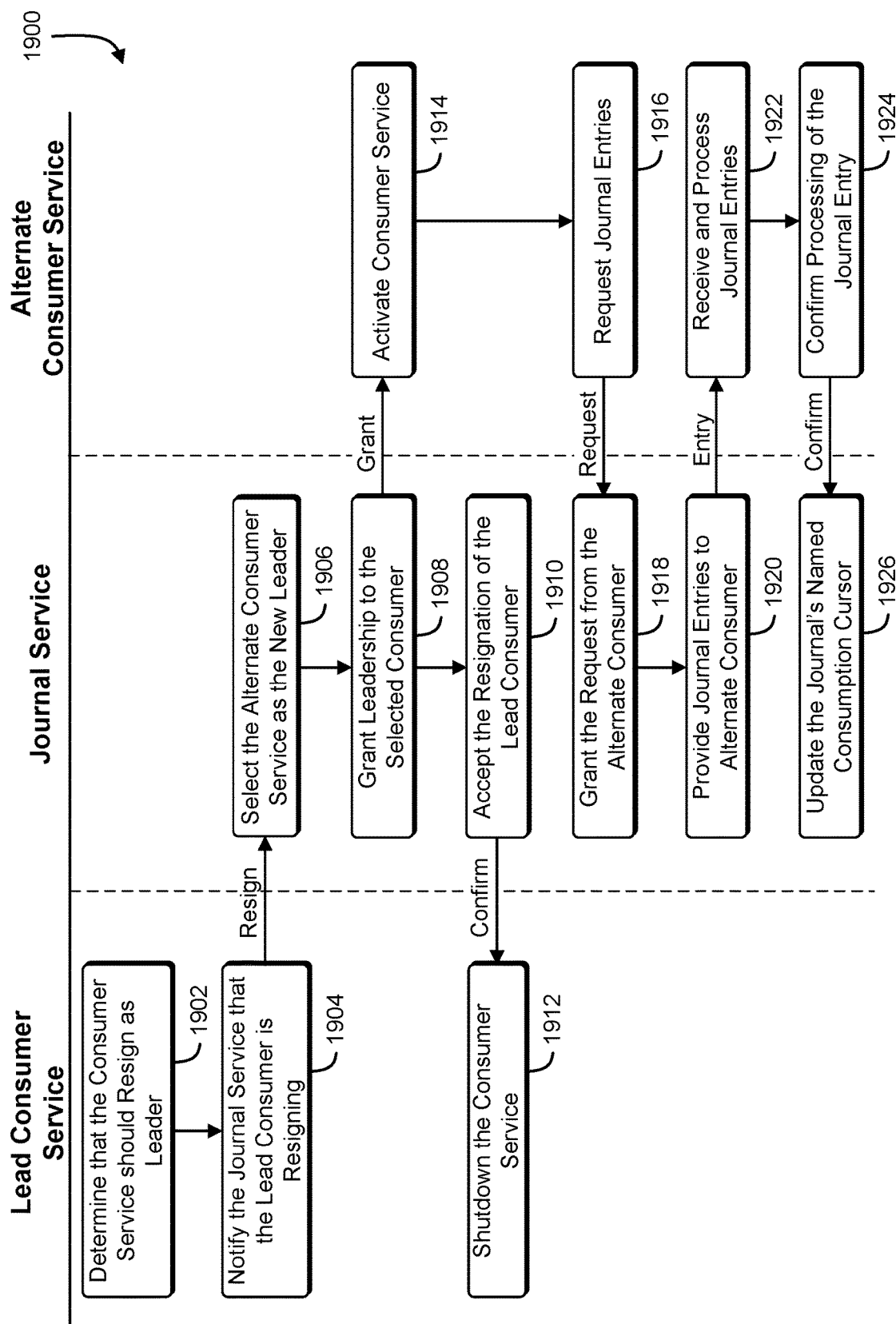
FIG. 19 shows an illustrative example of a process that, as a result of being performed by a journal service in coordination with a lead consumer service and an alternate consumer service, processes a resignation request from the lead consumer service, and replaces the lead consumer service with the alternate consumer service.

FIG. 19 shows an illustrative example of a process that, as a result of being performed by a journal service in coordination with a lead consumer service and an alternate consumer service, processes a resignation request from the lead consumer service, and replaces the lead consumer service with the alternate consumer service. A swim diagram 1900 illustrates a process that begins at block 1902 with a lead consumer service determining that the lead consumer service will resign as lead consumer. In some examples, the determination is made in response to detection of an impending failure of the lead consumer service. The impending failure may be the failure of network connectivity, a host computer system associated with the lead consumer service, or a critical support service used by the lead consumer service. In another example, the determination is made in response to a notification received from a host computer system, warning of an impending shutdown. At block 1904, the lead consumer service sends a notification to the journal service indicating that the lead consumer service is resigning. The notification may specify one or more cursors managed by the journal service.

At block 1906, the journal service receives the resignation notification from the lead consumer service. The journal service identifies the cursor that is affected by the resignation of the lead consumer service, and selects a replacement consumer from a pool of available alternate consumers. In the example shown in FIG. 19, the journal service selects the alternate consumer service as the new lead consumer. At block 1908, the journal service grants leadership over the identified cursor to the alternate consumer service, and sends a notification indicating the grant of leadership to the alternate consumer service. The journal service accepts 1910 the resignation of the lead consumer service, and sends a confirmation to the lead consumer service accepting the resignation. A block 1912, the lead consumer service receives the confirmation of resignation from the journal service, and shuts down the consumer service.

At block 1914, the alternate consumer service receives the notification from the journal service indicating that the alternate consumer service has been granted leadership. The notification identifies the cursor over which the alternate consumer service has been granted leadership. As a result of receiving the notification, the alternate consumer service activates. In some examples, the alternate consumer service transitions from a hibernated or suspended state to an active state as a result of receiving the notification. When a lead producer or lead consumer is granted leadership, and the lead producer or the lead consumer is allowed to access the journal, the journal service indicates, to the lead consumer or lead producer that leadership has been granted. Means for indicating, to the lead resource, that the lead consumer or lead producer has been granted access to the journal may be a computer system configured with circuitry or executable instructions that, as a result of being executed by a processor, send a message to the lead producer or consumer. In some examples, the message is sent using a procedure call to a messaging application programming interface. In additional examples, the message is sent using a procedure call, a remote procedure call, or messaging interface. In some implementations, the means for indicating is a computer system configured with circuitry or executable instructions that, as a result of being executed by a processor, wake the lead producer or consumer from an idle, suspended, or hibernated state.

At block 1916, the alternate consumer service submits a request for journal entries to the journal service, specifying the cursor. The journal service receives the request, confirms that the alternate consumer service is the authorized lead consumer for the cursor, and grants 1918 the request. At block 1920, the journal service locates the requested journal entries using the cursor and provides the requested journal entries to the alternate consumer service. The alternate consumer service receives 1922 the journal entries, and processes the journal entries in accordance with the purpose of the alternate consumer service. After processing the journal entries, the alternate consumer service sends 1924 a confirmation of processing to the journal service. At block 1926, the journal service receives the confirmation of processing from the alternate consumer service and, as a result, updates the cursor to indicate that the journal entries provided to the alternate consumer service have been processed.

Figure 20:
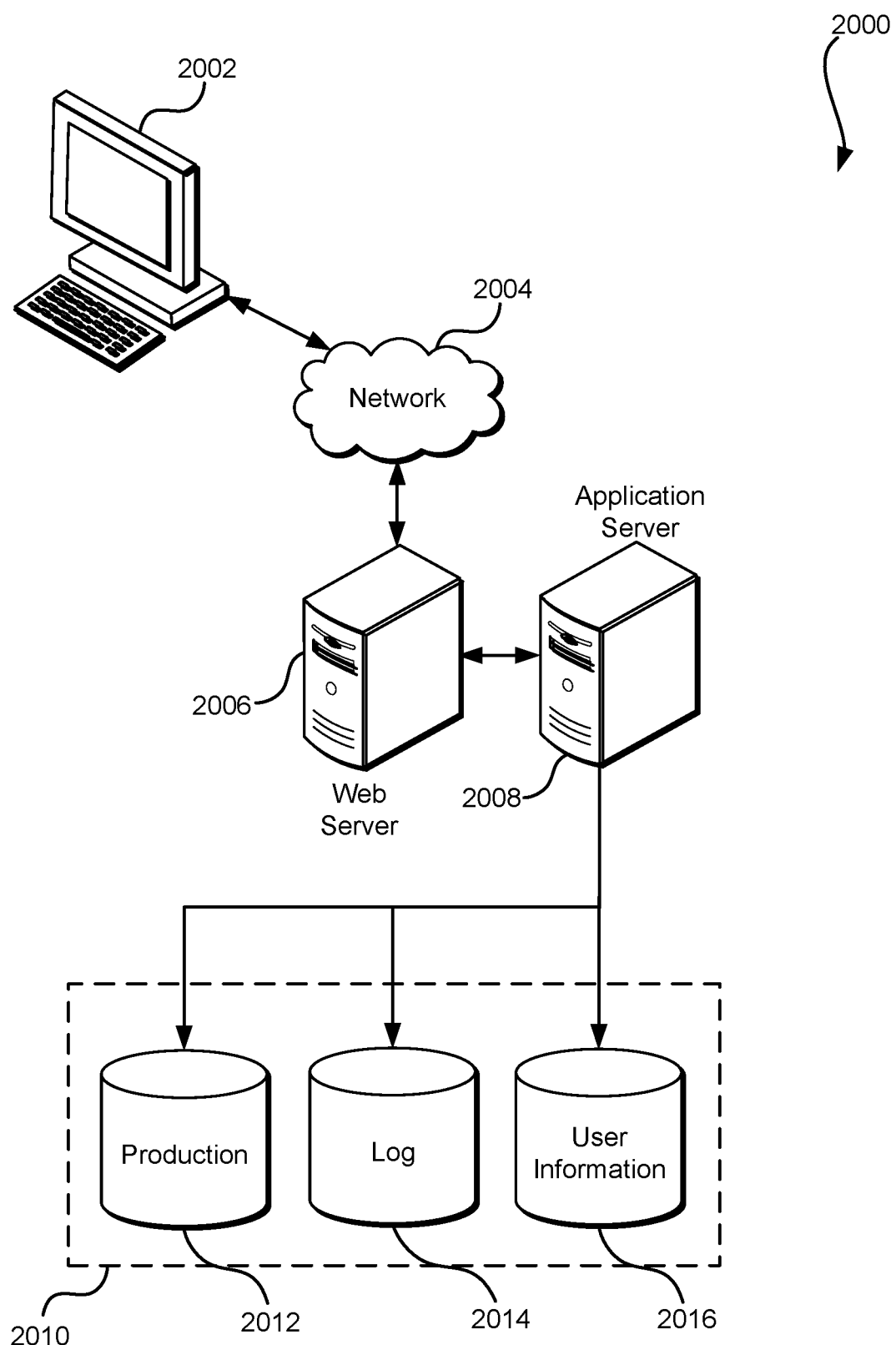
FIG. 20 illustrates an environment in which various embodiments can be implemented.

FIG. 20 illustrates aspects of an example environment 2000 for implementing aspects in accordance with various embodiments. As will be appreciated, although a web-based environment is used for purposes of explanation, different environments may be used, as appropriate, to implement various embodiments. The environment includes an electronic client device 2002, which can include any appropriate device operable to send and/or receive requests, messages, or information over an appropriate network 2004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 2006 for receiving requests and serving content in response thereto, although for other networks an alternative device serving a similar purpose could be used as would be apparent to one of ordinary skill in the art.

The illustrative environment includes at least one application server 2008 and a data store 2010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other usable content to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 2002 and the application server 2008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 2010 can include several separate data tables, databases, data documents, dynamic data storage schemes, and/or other data storage mechanisms and media for storing data relating to a particular aspect of the present disclosure. For example, the data store illustrated may include mechanisms for storing production data 2012 and user information 2016, which can be used to serve content for the production side. The data store also is shown to include a mechanism for storing log data 2014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update, or otherwise process data in response thereto. The application server 2008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 2002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the system 2000 in FIG. 20 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Note that the term "digital signature" includes any information usable to cryptographically verify authenticity of a message including information generated using an RSA-based digital scheme (such as RSA-PSS), the digital signature algorithm (DSA), the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar references in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a journal service hosted by the one or more computer systems, from a first consumer service, a first request identifying a named consumption cursor maintained by the journal service;
   identifying a journal entry within a journal maintained by the journal service based at least in part on a journal location indicated by the named consumption cursor, the journal comprising a plurality of journal entries having data to be processed by a set of consumer services including the first consumer service;
   designating the first consumer service as a lead consumer for the named consumption cursor and a second consumer service different than the first consumer service as an alternate consumer, where the alternate consumer processes journal entries when the lead consumer is unavailable;
   providing the journal entry to the first consumer service in response to the first request;
   receiving, from the first consumer service, a confirmation indicating that the journal entry has been processed by the first consumer service;
   as a result of receiving the confirmation, advancing the named consumption cursor;
   receiving, at the journal service, from the second consumer service, a second request identifying the named consumption cursor; and
   as a result of designating the first consumer service as the lead consumer and the second consumer service as the alternate consumer for the named consumption cursor, no journal entries are provided to the second consumer service.

2. The computer-implemented method of claim 1, wherein designating the first consumer service as the lead consumer is performed as a result of having determined that no consumer has been designated as the lead consumer for the named consumption cursor.

3. The computer-implemented method of claim 1, wherein designating the first consumer service as the lead consumer and the second consumer service as the alternate consumer is performed by at least:
   determining, for the second consumer service, a second fitness score based at least in part on processing capability metrics, cost information, and reliability information of the second consumer service;
   determining, for the first consumer service, a first fitness score based at least in part on processing capability metrics, cost information, and reliability information of the first consumer service;
   comparing the first fitness score to the second fitness score; and
   as a result of comparing the first fitness score to the second fitness score, selecting the first consumer service as the lead consumer and the second consumer service as the alternate consumer.

4. The computer-implemented method of claim 1, further comprising:
   receiving, at the journal service, from a first producer service, a first new journal entry and information identifying a named production cursor maintained by the journal service;

storing the first new journal entry to the journal at a location indicated by the named production cursor;

designating the first producer service as a lead producer for the named production cursor;

advancing the named production cursor;

notifying the first producer service that the first new journal entry has been stored to the journal;

receiving, at the journal service, from a second producer service, a third request to store a second new journal entry and information identifying the named production cursor; and as a result of having designated the first producer service as the lead producer for the named production cursor, denying the third request.

5. The computer-implemented method of claim 4, further comprising:

receiving, at the journal service, from a third producer service, a third new journal entry and information identifying the named production cursor;

designating the third producer service as an additional lead producer for the named production cursor;

storing the third new journal entry to the journal at the location indicated by the named production cursor; and advancing the named production cursor.

6. A system, comprising a computing device comprising a processor and memory storing instructions that, as a result of being executed by the processor of the computing device, cause the computing device to implement a journal service that maintains a journal and a named consumption cursor that indicates a position within the journal, the journal comprising journal entries having data to be processed by a set of potential consumers including a lead consumer, the journal service maintaining the journal by at least:

selecting, from the set of potential consumers, the lead consumer that is allowed to access the journal using the named consumption cursor and at least one alternate consumer to access the journal using the named consumption cursor in an event that the lead consumer is unavailable to process journal entries;

indicating, to the lead consumer, that the lead consumer is allowed to access the journal using the named consumption cursor;

providing a journal entry to the lead consumer, the journal entry selected from the journal using the named consumption cursor;

updating the named consumption cursor as a result of receiving an indication from the lead consumer; and preventing the at least one alternate consumer from accessing the journal using the named consumption cursor while the lead consumer is allowed to access the journal using the named consumption cursor.

7. The system of claim 6, wherein the journal service selects the lead consumer from the set of potential consumers at least in part by:

determining a first fitness score associated with the lead consumer;

determining a second fitness score associated with an individual consumer in the set of potential consumers;

comparing the first fitness score to the second fitness score; and wherein selecting the lead consumer is based at least in part on a result of comparing the first fitness score to the second fitness score and the at least one alternate consumer is the individual consumer.

8. The system of claim 7, wherein:

the journal service determines the second fitness score for the individual consumer based at least in part on an amount of computing resources available to the individual consumer; and the amount of computing resources includes at least one of an amount of memory, an amount of non-volatile storage space, a processor speed, a number of processors, and an amount of network bandwidth.

9. The system of claim 7, wherein:

the journal service determines the second fitness score for the individual consumer based at least in part on a cost associated with operating an individual consumer; and the cost associated with operating the individual consumer is based at least in part on a cost of operating a host computer system associated with the individual consumer.

10. The system of claim 6, wherein the set of potential consumers is determined at least in part by:

receiving a request from an individual consumer, the request indicating that the individual consumer is capable of being the lead consumer; and adding the individual consumer to the set of potential consumers.

11. The system of claim 6, wherein the set of potential consumers is determined at least in part by:

identifying, from a pool of consumers, individual consumers that are capable of handling journal entries associated with the named consumption cursor; and adding the individual consumers to the set of potential consumers.

12. The system of claim 6, wherein the journal service further notifies unselected consumers in the set of potential consumers that the unselected consumers are not authorized to retrieve journal entries from the journal service using the named consumption cursor.

13. The system of claim 6, wherein the journal service further, as a result of having indicated, to the lead consumer, that the lead consumer is allowed to access the journal using the named consumption cursor, causes the lead consumer to transition from a suspended state to an active state.

14. The system of claim 6, wherein:

the memory further includes instructions that, as a result of being executed by the processor of the computing device, cause the computing device to maintain a named production cursor that indicates a position within the journal; and the journal service further maintaining the journal by at least:

selecting, from a set of potential producers, a lead producer that is allowed to access the journal using the named production cursor;

adding a new journal entry to the journal at a location indicated by the named production cursor, the new journal entry provided by the lead producer;

updating the named production cursor; and preventing producers other than the lead producer from accessing the journal using the named production cursor while the lead producer is allowed to access the journal using the named production cursor.

15. A non-transitory computer-readable storage medium storing thereon executable instructions that, as a result of being executed by one or more processors of a computer system, cause the computer system to at least:

execute a journal service that maintains a journal and a named consumption cursor that indicates a position within the journal, the journal comprising journal entries having data to be processed by a set of potential consumers including a lead consumer;

select, from the set of potential consumers, the lead consumer that is allowed to access the journal using the named consumption cursor and an alternate consumer that is allowed to access the journal using the named consumption cursor as a result of the lead consumer failing;

indicate, to the lead consumer, that the lead consumer is allowed to access the journal using the named consumption cursor;

provide a journal entry to the lead consumer, the journal entry selected from the journal using the named consumption cursor;

update the named consumption cursor as a result of receiving an indication from the lead consumer; and prevent the alternate consumer from accessing the journal using the named consumption cursor while the lead consumer is allowed to access the journal using the named consumption cursor.

16. The system of claim 15, wherein the executable instructions that cause the computer system to prevent the alternate consumer from accessing the journal using the named consumption further include executable instructions that, as a result of being executed by the one or more processors of the computer system, cause the computer system to:

receive, from a particular resource in the set of potential consumers, a request to interact with the journal; and cause the particular resource to wait for a response to the request.

17. The system of claim 15, wherein the executable instructions further include executable instructions that, as a result of being executed by the one or more processors of the computer system, cause the computer system to: executable instructions further cause the computer system to:

determine a fitness score associated with an individual resource in the set of potential consumers; and select the lead consumer from the set of potential consumers based at least in part on the fitness score.

18. The system of claim 17, wherein the executable instructions that cause the computer system to determine the fitness score further include executable instructions that, as a result of being executed by the one or more processors of the computer system, cause the computer system to:

submit a task to the individual resource;

cause the individual resource to perform the task;

collect a performance metric based at least in part on the performance of the task by the individual resource; and generate the fitness score based at least in part on the performance metric.

19. The system of claim 15, wherein the executable instructions further cause the computer system to:

select a number of lead producers from a set of producers, at least one lead producer of the number of lead producers based at least in part on a rate at which a lead consumer consumes journal entries;

allow the number of lead producers to interact with the journal at another location within the journal determined at least in part by a named production cursor;

update the named production cursor in response to any of the number of lead producers having interacted with the journal; and prevent resources other than the number of lead producers from interacting with the journal using the named production cursor.

20. The system of claim 15, wherein the executable instructions further cause the computer system to:

select an additional lead consumer from the set of potential consumers;

allow the additional lead consumer to interact with the journal, at another location within the journal determined at least in part by an additional named cursor;

update the additional named cursor in response to the additional lead consumer having interacted with the journal; and prevent resources other than the additional lead consumer from interacting with the journal using the additional named cursor.

* * * * *